US011521482B2

(12) United States Patent
Neyhart

(10) Patent No.: US 11,521,482 B2
(45) Date of Patent: *Dec. 6, 2022

(54) NETWORK ACCESS COORDINATION OF LOAD CONTROL DEVICES

(71) Applicant: Lutron Technology Company LLC, Coopersburg, PA (US)

(72) Inventor: Jeremy Thomas Neyhart, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/989,145

(22) Filed: Aug. 10, 2020

(65) Prior Publication Data

US 2021/0044113 A1    Feb. 11, 2021

Related U.S. Application Data

(63) Continuation of application No. 16/102,357, filed on Aug. 13, 2018, now Pat. No. 10,742,032, which is a
(Continued)

(51) Int. Cl.
*G08C 17/02* (2006.01)
*H04L 12/28* (2006.01)
(Continued)

(52) U.S. Cl.
CPC ............. *G08C 17/02* (2013.01); *G05B 15/02* (2013.01); *H04L 12/2807* (2013.01);
(Continued)

(58) Field of Classification Search
CPC ......... H02J 3/14; H04W 76/20; H04W 74/00; G05B 15/02; G08C 17/02; H04L 12/2807; H04L 12/2823; H04L 2012/2841
See application file for complete search history.

(56) References Cited

U.S. PATENT DOCUMENTS

| 4,864,588 A | 9/1989 | Simpson et al. |
| 4,932,037 A | 6/1990 | Simpson et al. |

(Continued)

FOREIGN PATENT DOCUMENTS

| CA | 2892464 A1 | 11/2015 |
| CN | 101789978 A | 7/2010 |

(Continued)

OTHER PUBLICATIONS

International Publication No. WO 2013/003813, International Search Report dated Oct. 24, 2012, 5 pages.

(Continued)

*Primary Examiner* — Michael J Moore, Jr.
(74) *Attorney, Agent, or Firm* — Michael Czarnecki; Glen Farbanish; Philip Smith

(57) ABSTRACT

An apparatus may control the power delivered from an AC power source to an electrical load, and may comprise a controllably conductive device. The apparatus may also comprise a controller that may be operatively coupled to a control input of the controllably conductive device. The apparatus may also include a first wireless communication circuit operable to communicate via a first protocol and to join a first wireless communication network operable to communicate via the first protocol. The first wireless communication circuit may be in communication with the controller. The controller may be operative to determine a first condition for communicating via the first protocol. The controller may also be operable to control the first wireless communication circuit to join the first wireless communication network upon the first condition being satisfied.

26 Claims, 15 Drawing Sheets

Related U.S. Application Data continuation of application No. 15/011,257, filed on Jan. 29, 2016, now Pat. No. 10,050,444, which is a continuation of application No. 13/796,486, filed on Mar. 12, 2013, now Pat. No. 9,413,171.

(60) Provisional application No. 61/745,419, filed on Dec. 21, 2012.

(51) Int. Cl.
*H04W 76/20* (2018.01)
*G05B 15/02* (2006.01)
*H04W 74/00* (2009.01)

(52) U.S. Cl.
CPC ......... *H04L 12/2823* (2013.01); *H04W 76/20* (2018.02); *H04L 2012/2841* (2013.01); *H04W 74/00* (2013.01)

(56) References Cited

U.S. PATENT DOCUMENTS

| | | |
|---|---|---|
| 4,995,053 A | 2/1991 | Simpson et al. |
| 5,239,205 A | 8/1993 | Hoffman et al. |
| 5,340,954 A | 8/1994 | Hoffman et al. |
| 5,454,077 A | 9/1995 | Cheron |
| 5,488,571 A | 1/1996 | Jacobs et al. |
| 5,519,704 A | 5/1996 | Farinacci et al. |
| 5,602,540 A | 2/1997 | Spillman |
| 5,627,863 A | 5/1997 | Aslanis et al. |
| 5,637,930 A | 6/1997 | Rowen et al. |
| 5,637,964 A | 6/1997 | Hakkarainen et al. |
| 5,736,965 A | 4/1998 | Mosebrook et al. |
| 5,812,819 A | 9/1998 | Rodwin et al. |
| 5,818,128 A | 10/1998 | Hoffman et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,982,103 A | 11/1999 | Mosebrook et al. |
| 6,167,464 A | 12/2000 | Kretschmann |
| 6,169,377 B1 | 1/2001 | Bryde et al. |
| 6,300,727 B1 | 10/2001 | Bryde et al. |
| 6,324,089 B1 | 11/2001 | Symoen et al. |
| 6,380,696 B1 | 4/2002 | Sembhi et al. |
| 6,437,692 B1 | 8/2002 | Petite et al. |
| 6,526,581 B1 | 2/2003 | Edson |
| 6,545,434 B2 | 4/2003 | Sembhi et al. |
| 6,687,487 B1 | 2/2004 | Mosebrook et al. |
| 6,803,728 B2 | 10/2004 | Balasubramaniam et al. |
| 6,807,463 B1 | 10/2004 | Cunningham et al. |
| 6,831,569 B2 | 12/2004 | Wang et al. |
| 6,856,236 B2 | 2/2005 | Christensen et al. |
| 6,859,644 B2 | 2/2005 | Wang |
| 6,876,295 B1 | 4/2005 | Lewis |
| 6,879,806 B2 | 4/2005 | Shorty |
| 6,891,838 B1 | 5/2005 | Petite et al. |
| 6,903,650 B2 | 6/2005 | Murray |
| 6,914,533 B2 | 7/2005 | Petite |
| 6,914,893 B2 | 7/2005 | Petite |
| 6,927,547 B2 | 8/2005 | Walko et al. |
| 6,980,080 B2 | 12/2005 | Christensen et al. |
| 7,035,270 B2 | 4/2006 | Moore et al. |
| 7,053,767 B2 | 5/2006 | Petite et al. |
| 7,085,627 B2 | 8/2006 | Bamberger et al. |
| 7,089,066 B2 | 8/2006 | Hesse et al. |
| 7,102,502 B2 | 9/2006 | Autret |
| 7,103,511 B2 | 9/2006 | Petite |
| 7,106,261 B2 | 9/2006 | Nagel et al. |
| 7,126,291 B2 | 10/2006 | Kruse et al. |
| 7,211,968 B2 | 5/2007 | Adamson et |
| 7,218,998 B1 | 5/2007 | Neale |
| 7,219,141 B2 | 5/2007 | Bonasia et al. |
| 7,307,542 B1 | 12/2007 | Chandler et al. |
| 7,323,991 B1 | 1/2008 | Eckert et al. |
| 7,345,270 B1 | 3/2008 | Jones et al. |
| 7,346,016 B2 | 3/2008 | Nielsen et al. |
| 7,358,927 B2 | 4/2008 | Luebke et al. |
| 7,362,285 B2 | 4/2008 | Webb et al. |
| 7,408,525 B2 | 8/2008 | Webb et al. |
| 7,498,952 B2 | 3/2009 | Newman |
| 7,525,928 B2 | 4/2009 | Cutler |
| 7,548,216 B2 | 6/2009 | Webb et al. |
| 7,573,208 B2 | 8/2009 | Newman et al. |
| 7,573,436 B2 | 8/2009 | Webb et al. |
| 7,598,684 B2 | 10/2009 | Lys et al. |
| 7,687,744 B2 | 3/2010 | Walter et al. |
| 7,697,492 B2 | 4/2010 | Petite |
| 7,714,790 B1 | 5/2010 | Feldstein et al. |
| 7,755,505 B2 | 7/2010 | Johnson et al. |
| 7,756,086 B2 | 7/2010 | Petite et al. |
| 7,756,097 B2 | 7/2010 | Uehara et al. |
| 7,756,556 B2 | 7/2010 | Patel et al. |
| 7,805,134 B2 * | 9/2010 | Mirza-Baig ......... H04L 41/0816 455/418 |
| 7,821,160 B1 | 10/2010 | Roosli et al. |
| 7,847,706 B1 * | 12/2010 | Ross ...................... G08C 17/02 340/5.1 |
| 7,852,765 B2 | 12/2010 | Neuman et al. |
| 7,853,221 B2 | 12/2010 | Rodriguez et al. |
| 7,889,051 B1 | 2/2011 | Billig et al. |
| 8,013,732 B2 | 9/2011 | Petite et al. |
| 8,031,650 B2 | 10/2011 | Petite et al. |
| 8,035,255 B2 | 10/2011 | Kurs et al. |
| 8,146,074 B2 | 3/2012 | Ito et al. |
| 8,173,920 B2 | 5/2012 | Altonen et al. |
| 8,228,163 B2 | 7/2012 | Cash et al. |
| 8,254,838 B2 | 8/2012 | Feldstein |
| 8,339,247 B2 | 12/2012 | Adamson et al. |
| 8,364,319 B2 | 1/2013 | Roosli |
| 8,368,310 B1 | 2/2013 | Roosli |
| 8,379,564 B2 | 2/2013 | Petite et al. |
| 8,396,007 B2 | 3/2013 | Gonia et al. |
| 8,416,074 B2 * | 4/2013 | Sadwick ................ G08C 17/00 340/12.3 |
| 8,525,372 B2 | 9/2013 | Huang |
| 8,548,607 B1 * | 10/2013 | Belz ........................ G16Z 99/00 700/286 |
| 8,598,978 B2 | 12/2013 | Knode |
| 8,649,883 B2 * | 2/2014 | Lu ........................... G05B 13/02 700/297 |
| 8,742,686 B2 | 6/2014 | Zampini et al. |
| 8,792,401 B2 | 7/2014 | Banks et al. |
| 8,826,046 B2 * | 9/2014 | Lu ....................... H04L 12/2836 713/300 |
| 8,892,261 B2 | 11/2014 | Hoonhout et al. |
| 9,049,753 B1 * | 6/2015 | Wassel ................... H05B 47/19 |
| 9,066,381 B2 | 6/2015 | Valois et al. |
| 9,178,369 B2 | 11/2015 | Partovi |
| 9,253,857 B2 * | 2/2016 | Van Der Werff ...... H05B 47/11 |
| 9,288,228 B2 | 3/2016 | Suumäki |
| 9,368,025 B2 | 6/2016 | Carmen |
| 9,413,171 B2 | 8/2016 | Neyhart |
| 9,418,543 B1 * | 8/2016 | Ross ...................... G08C 17/02 |
| 9,445,482 B2 | 9/2016 | Brochu et al. |
| 9,445,485 B2 | 9/2016 | Reed |
| 9,548,797 B1 | 1/2017 | Green et al. |
| 9,641,959 B2 | 5/2017 | Brochu et al. |
| 9,766,645 B2 * | 9/2017 | Imes ......................... H02J 3/386 |
| 9,767,249 B1 * | 9/2017 | Belz .................. H02J 13/00002 |
| 10,019,047 B2 | 7/2018 | Bull |
| 10,050,444 B2 | 8/2018 | Neyhart |
| 10,135,629 B2 | 11/2018 | Browne et al. |
| 10,244,086 B2 | 3/2019 | Newman et al. |
| 10,271,407 B2 | 4/2019 | Pessina et al. |
| 10,314,132 B1 * | 6/2019 | Wilde .................... H05B 45/20 |
| 10,516,546 B2 | 12/2019 | Browne et al. |
| 10,587,147 B2 | 3/2020 | Carmen |
| 10,588,204 B2 | 3/2020 | Pessina et al. |
| 10,693,558 B2 | 6/2020 | Economy |
| 2001/0024164 A1 | 9/2001 | Kawamura et al. |
| 2002/0010518 A1 | 1/2002 | Reid et al. |
| 2002/0043938 A1 | 4/2002 | Lys |
| 2002/0060530 A1 | 5/2002 | Sembhi et al. |
| 2002/0073183 A1 | 6/2002 | Yoon et al. |

(56) References Cited

U.S. PATENT DOCUMENTS

| | | |
|---|---|---|
| 2002/0087436 A1 | 7/2002 | Guthrie et al. |
| 2002/0113909 A1 | 8/2002 | Sherwood |
| 2002/0154025 A1 | 10/2002 | Ling |
| 2003/0034898 A1 | 2/2003 | Shamoon et al. |
| 2003/0040813 A1 | 2/2003 | Gonzales et al. |
| 2003/0109270 A1 | 6/2003 | Shorty |
| 2003/0151493 A1 | 8/2003 | Straumann et al. |
| 2003/0197993 A1 | 10/2003 | Mirowski et al. |
| 2004/0036624 A1 | 2/2004 | Ballew et al. |
| 2004/0052076 A1 | 3/2004 | Mueller et al. |
| 2004/0058706 A1 | 3/2004 | Williamson et al. |
| 2004/0059840 A1 | 3/2004 | Ware et al. |
| 2004/0193998 A1 | 9/2004 | Blackburn et al. |
| 2004/0217718 A1 | 11/2004 | Kumar et al. |
| 2005/0030153 A1 | 2/2005 | Mullet et al. |
| 2005/0045429 A1 | 3/2005 | Baker |
| 2005/0048944 A1 | 3/2005 | Wu |
| 2005/0156708 A1 | 7/2005 | Puranik et al. |
| 2005/0179558 A1 | 8/2005 | Williams et al. |
| 2005/0253538 A1 | 11/2005 | Shah et al. |
| 2005/0285547 A1 | 12/2005 | Piepgras et al. |
| 2006/0027081 A1 | 2/2006 | Chang et al. |
| 2006/0044152 A1 | 3/2006 | Wang |
| 2006/0109203 A1 | 5/2006 | Huber et al. |
| 2006/0154598 A1 | 7/2006 | Rudland et al. |
| 2006/0171332 A1 | 8/2006 | Barnum |
| 2006/0174102 A1 | 8/2006 | Smith et al. |
| 2006/0192697 A1 | 8/2006 | Quick et al. |
| 2006/0202851 A1* | 9/2006 | Cash .................. H05B 47/195 340/12.23 |
| 2006/0251059 A1 | 11/2006 | Otsu et al. |
| 2006/0256798 A1 | 11/2006 | Quick et al. |
| 2006/0273970 A1 | 12/2006 | Mosebrook et al. |
| 2006/0284734 A1 | 12/2006 | Newman |
| 2006/0285150 A1 | 12/2006 | Jung et al. |
| 2007/0051529 A1 | 3/2007 | Soccoli et al. |
| 2007/0083294 A1 | 4/2007 | Bruno |
| 2007/0085699 A1 | 4/2007 | Walters et al. |
| 2007/0085700 A1 | 4/2007 | Walters et al. |
| 2007/0085701 A1 | 4/2007 | Walters et al. |
| 2007/0085702 A1 | 4/2007 | Walters et al. |
| 2007/0097993 A1 | 5/2007 | Bojahra et al. |
| 2007/0110192 A1 | 5/2007 | Steiner |
| 2007/0112939 A1* | 5/2007 | Wilson .................. H04L 12/282 709/219 |
| 2007/0121323 A1 | 5/2007 | Pawlik et al. |
| 2007/0165997 A1 | 7/2007 | Suzuki et al. |
| 2007/0176788 A1 | 8/2007 | Mor et al. |
| 2007/0229300 A1 | 10/2007 | Masato et al. |
| 2007/0233323 A1* | 10/2007 | Wiemeyer ........... H04L 12/2827 700/275 |
| 2008/0055073 A1 | 3/2008 | Raneri et al. |
| 2008/0068126 A1 | 3/2008 | Johnson et al. |
| 2008/0068204 A1 | 3/2008 | Carmen et al. |
| 2008/0089266 A1 | 4/2008 | Orsat |
| 2008/0111491 A1 | 5/2008 | Spira |
| 2008/0136261 A1 | 6/2008 | Mierta |
| 2008/0136356 A1 | 6/2008 | Zampini et al. |
| 2008/0136663 A1 | 6/2008 | Courtney et al. |
| 2008/0147337 A1 | 6/2008 | Walters et al. |
| 2008/0148359 A1 | 6/2008 | Kezys et al. |
| 2008/0183316 A1 | 7/2008 | Clayton |
| 2008/0192767 A1 | 8/2008 | Howe et al. |
| 2008/0218099 A1 | 9/2008 | Newman |
| 2008/0258650 A1 | 10/2008 | Steiner et al. |
| 2008/0265799 A1* | 10/2008 | Sibert .................. H05B 47/175 315/292 |
| 2008/0278297 A1 | 11/2008 | Steiner et al. |
| 2008/0284327 A1 | 11/2008 | Kang et al. |
| 2009/0001941 A1 | 1/2009 | Hsu et al. |
| 2009/0026966 A1 | 1/2009 | Budde et al. |
| 2009/0079268 A1 | 3/2009 | Cook et al. |
| 2009/0085408 A1 | 4/2009 | Bruhn |
| 2009/0113229 A1 | 4/2009 | Cataldo et al. |
| 2009/0150004 A1 | 6/2009 | Wang et al. |
| 2009/0167484 A1 | 7/2009 | Burr |
| 2009/0206983 A1 | 8/2009 | Knode et al. |
| 2009/0227205 A1 | 9/2009 | Rofougaran |
| 2009/0251352 A1 | 10/2009 | Altonen et al. |
| 2009/0302782 A1* | 12/2009 | Smith .................. H05B 47/165 315/297 |
| 2009/0315672 A1 | 12/2009 | Nantz et al. |
| 2009/0322251 A1 | 12/2009 | Hilgers |
| 2010/0012738 A1 | 1/2010 | Park |
| 2010/0031076 A1 | 2/2010 | Wan et al. |
| 2010/0052574 A1 | 3/2010 | Blakeley et al. |
| 2010/0052576 A1 | 3/2010 | Steiner et al. |
| 2010/0081375 A1 | 4/2010 | Rosenblatt et al. |
| 2010/0104255 A1 | 4/2010 | Yun et al. |
| 2010/0114242 A1 | 5/2010 | Doerr et al. |
| 2010/0127821 A1 | 5/2010 | Jones et al. |
| 2010/0134341 A1 | 6/2010 | Priest |
| 2010/0141153 A1 | 6/2010 | Recker et al. |
| 2010/0207532 A1 | 8/2010 | Mans |
| 2010/0207759 A1 | 8/2010 | Sloan et al. |
| 2010/0235008 A1 | 9/2010 | Forbes et al. |
| 2010/0238001 A1 | 9/2010 | Veskovic |
| 2010/0238003 A1 | 9/2010 | Chan et al. |
| 2010/0244706 A1 | 9/2010 | Steiner et al. |
| 2010/0262296 A1 | 10/2010 | Davis et al. |
| 2010/0289430 A1 | 11/2010 | Stelzer et al. |
| 2010/0303099 A1 | 12/2010 | Rieken |
| 2011/0006908 A1 | 1/2011 | Frantz |
| 2011/0012738 A1 | 1/2011 | Nakamura et al. |
| 2011/0039137 A1 | 2/2011 | Knobloch et al. |
| 2011/0043163 A1* | 2/2011 | Baarman .................. H04L 12/10 320/108 |
| 2011/0046792 A1* | 2/2011 | Imes .................. G05D 23/1917 700/278 |
| 2011/0078411 A1 | 3/2011 | Maclinovsky et al. |
| 2011/0095622 A1 | 4/2011 | Feldstein et al. |
| 2011/0113475 A1 | 5/2011 | Garcia Morchon |
| 2011/0121654 A1* | 5/2011 | Recker ............... H05B 45/3725 307/64 |
| 2011/0202910 A1* | 8/2011 | Venkatakrishnan ... G06Q 50/06 709/236 |
| 2011/0208369 A1 | 8/2011 | Yang et al. |
| 2011/0244798 A1 | 10/2011 | Daigle et al. |
| 2011/0244897 A1 | 10/2011 | Shibuya |
| 2011/0282468 A1* | 11/2011 | Ashdown ............. H05B 47/175 700/90 |
| 2011/0282495 A1 | 11/2011 | Fischer et al. |
| 2011/0305200 A1 | 12/2011 | Schoofs et al. |
| 2012/0018578 A1 | 1/2012 | Polcuch |
| 2012/0039400 A1 | 2/2012 | Rieken |
| 2012/0086561 A1 | 4/2012 | Ilyes et al. |
| 2012/0086562 A1 | 4/2012 | Steinberg |
| 2012/0091804 A1* | 4/2012 | Altonen .................. H04L 12/413 307/31 |
| 2012/0091910 A1 | 4/2012 | Zhang et al. |
| 2012/0093039 A1 | 4/2012 | Rofougaran et al. |
| 2012/0094658 A1 | 4/2012 | Macias et al. |
| 2012/0095601 A1* | 4/2012 | Abraham ............. H04L 12/2816 713/320 |
| 2012/0108230 A1 | 5/2012 | Stepanian |
| 2012/0109384 A1* | 5/2012 | Stepanian ............. G06F 1/1698 700/275 |
| 2012/0158203 A1* | 6/2012 | Feldstein ............... G06F 1/3231 713/320 |
| 2012/0163663 A1 | 6/2012 | Masoud et al. |
| 2012/0175969 A1 | 7/2012 | Maughan et al. |
| 2012/0235504 A1 | 9/2012 | Kesler et al. |
| 2012/0235579 A1 | 9/2012 | Chemel et al. |
| 2012/0239963 A1 | 9/2012 | Smith |
| 2012/0250831 A1 | 10/2012 | Gorecki, Jr. |
| 2012/0254961 A1 | 10/2012 | Kim et al. |
| 2012/0257543 A1 | 10/2012 | Baum et al. |
| 2012/0274670 A1 | 11/2012 | Lee et al. |
| 2012/0275391 A1 | 11/2012 | Cui et al. |
| 2012/0303768 A1 | 11/2012 | Fiennes |
| 2012/0306621 A1 | 12/2012 | Muthu |
| 2012/0315848 A1 | 12/2012 | Smith et al. |
| 2012/0322370 A1 | 12/2012 | Lee |

(56) References Cited

U.S. PATENT DOCUMENTS

| | | |
|---|---|---|
| 2012/0328302 A1 | 12/2012 | Iizuka et al. |
| 2013/0010018 A1 | 1/2013 | Economy |
| 2013/0014224 A1 | 1/2013 | Graves et al. |
| 2013/0026947 A1* | 1/2013 | Economy ............... H04W 4/70 315/287 |
| 2013/0030589 A1* | 1/2013 | Pessina ............... G05B 15/02 700/295 |
| 2013/0049633 A1* | 2/2013 | Wann ............... H05B 45/24 315/294 |
| 2013/0051375 A1 | 2/2013 | Chemishkian et al. |
| 2013/0063042 A1 | 3/2013 | Bora et al. |
| 2013/0073431 A1 | 3/2013 | Suro et al. |
| 2013/0100855 A1* | 4/2013 | Jung ............... H04W 76/11 370/254 |
| 2013/0113993 A1* | 5/2013 | Dagit, III ......... H04N 21/41265 348/734 |
| 2013/0134774 A1* | 5/2013 | Kennedy ............... G06F 1/26 439/620.23 |
| 2013/0134783 A1 | 5/2013 | Mohammediyan et al. |
| 2013/0187563 A1 | 7/2013 | Sasai et al. |
| 2013/0211844 A1* | 8/2013 | Sadwick ............... G08C 17/02 704/275 |
| 2013/0223279 A1* | 8/2013 | Tinnakornsrisuphap ............... H04W 76/10 370/254 |
| 2013/0261821 A1* | 10/2013 | Lu ............... G05B 13/02 700/289 |
| 2013/0286889 A1 | 10/2013 | Cherian et al. |
| 2013/0322281 A1* | 12/2013 | Ludlow ............... H04W 48/18 370/252 |
| 2014/0001977 A1* | 1/2014 | Zacharchuk ......... H04B 7/0608 323/318 |
| 2014/0067137 A1* | 3/2014 | Amelio ............. H02J 13/00026 327/365 |
| 2014/0070919 A1 | 3/2014 | Jackson et al. |
| 2014/0075523 A1* | 3/2014 | Tuomaala ............... H04L 63/08 726/6 |
| 2014/0106735 A1 | 4/2014 | Jackson et al. |
| 2014/0163742 A1 | 6/2014 | Element |
| 2014/0163751 A1* | 6/2014 | Davis ............... G05B 15/02 700/286 |
| 2014/0175875 A1 | 6/2014 | Newman, Jr. et al. |
| 2014/0177469 A1 | 6/2014 | Neyhart |
| 2014/0180487 A1 | 6/2014 | Bull |
| 2014/0277805 A1 | 9/2014 | Browne et al. |
| 2014/0289825 A1 | 9/2014 | Chan et al. |
| 2014/0304773 A1 | 10/2014 | Woods et al. |
| 2014/0375421 A1 | 12/2014 | Morrison et al. |
| 2014/0375428 A1 | 12/2014 | Park |
| 2015/0017973 A1 | 1/2015 | Gold |
| 2015/0097666 A1 | 4/2015 | Boyd et al. |
| 2015/0200925 A1 | 7/2015 | Lagerstedt et al. |
| 2015/0239353 A1 | 8/2015 | Cregut |
| 2015/0259078 A1 | 9/2015 | Filipovic et al. |
| 2015/0342011 A1 | 11/2015 | Brochu et al. |
| 2016/0119032 A1 | 4/2016 | Choi et al. |
| 2016/0148449 A1 | 5/2016 | God et al. |
| 2016/0149411 A1 | 5/2016 | Neyhart |
| 2016/0254699 A1 | 9/2016 | Carmen |
| 2016/0285550 A1 | 9/2016 | Economy |
| 2017/0064798 A1 | 3/2017 | Economy et al. |
| 2017/0185120 A9* | 6/2017 | Imes ............... H04L 12/2803 |
| 2017/0264452 A1 | 9/2017 | Vollmer et al. |
| 2018/0168019 A1 | 6/2018 | Baker et al. |
| 2018/0198893 A1 | 7/2018 | Newman et al. |
| 2018/0205460 A1 | 7/2018 | Economy |
| 2018/0321722 A1 | 11/2018 | Bull |
| 2018/0324933 A1 | 11/2018 | Hammett et al. |
| 2019/0006846 A1* | 1/2019 | Neyhart ............... G05B 15/02 |
| 2020/0092003 A1 | 3/2020 | Economy |
| 2020/0195460 A1 | 6/2020 | Browne et al. |

FOREIGN PATENT DOCUMENTS

| | | |
|---|---|---|
| DE | 102006046489 A1 | 4/2008 |
| DE | 102009056152 A1 | 6/2011 |
| EP | 0767551 B1 | 8/2002 |
| EP | 1727399 A2 | 11/2006 |
| EP | 1693991 B1 | 7/2009 |
| GB | 2533675 A | 6/2016 |
| JP | 2011-023819 A | 2/2011 |
| WO | 1999046921 A2 | 9/1999 |
| WO | 2001052515 A1 | 7/2001 |
| WO | 2001074045 A1 | 10/2001 |
| WO | 2002071689 A2 | 9/2002 |
| WO | 2001052515 A9 | 10/2002 |
| WO | 2002071689 A3 | 11/2002 |
| WO | 2003007665 A1 | 1/2003 |
| WO | 2004023849 A1 | 3/2004 |
| WO | 2004056157 A1 | 7/2004 |
| WO | 2006133172 A2 | 12/2006 |
| WO | 2007069129 A2 | 6/2007 |
| WO | 2008040454 A2 | 4/2008 |
| WO | 2008092082 A2 | 7/2008 |
| WO | 2008095250 A1 | 8/2008 |
| WO | 2009010916 A2 | 1/2009 |
| WO | 2010027412 A1 | 3/2010 |
| WO | 2010143130 A1 | 12/2010 |
| WO | 2011064244 A2 | 6/2011 |
| WO | 2018099793 A1 | 6/2018 |

OTHER PUBLICATIONS

International Publication No. WO 2013/012547, International Search Report dated Oct. 29, 2012, 6 pages.

International Publication No. WO 2013/003804, International Search Report dated Apr. 2, 2013, 8 pages.

"CEDIA 2012: Crestron Demos Home Technology Control Solution with NFC-Enabled Mobile Device", Available at http://www.youtubecom/watch?v=qXwoTJX14BE, retrieved on Aug. 13, 2013, Video Provided on CD Media, Sep. 8, 2012, pp. 1-2.

"Crestron NFC Demo at CEDIA Expo 2012", Available at http://www.youtube.com/watch?v=FQ1f5vxwqnl, Retrieved on Aug. 13, 2013, Transcript of Video provided on CD media, Sep. 10, 2012, pp. 1-2.

"SimpleLink™ CC3000 Boosterpack Jump-Starts the Internet of Things", Available at http://www.youtube.com/watch?v=6kh0gOKMIQc, retrieved on Aug. 13, 2013, Transcript of Video provided on CD Media, Jun. 6, 2013, 1 page.

Black, Rich , "Clear Connect RF Technology", Lutron Electronics Company, Inc., Aug. 2009, 16 pages.

Gade, Lisa , "PalmOne Treo 600 Palm OS Smartphone from Sprint PCS", Mobile Tech Review, Document Available at http://www.mobiletechreview.com/treo_600.htm, retrieved on May 21, 2013, Oct. 28, 2003, 4 pages.

Gade, Lisa , "PalmOne Treo 650 Palm OS Smartphone:CDMA (Sprint) and GSM Versions", Mobile Tech Review, Document Available at: http://web.archive.org/web/20050404004524/http://www.mobiletechreview.com/Treo_650.him, Retrieved on May 21, 2013, Dec. 10, 2004, 6 pages.

JS JS Designs Plc , "JS JS Products", Available at http://web.archive.org/web/20101111085355/http://www.jsjsdesigns.com/product.html, Nov. 11, 2010, 4 pages.

Myers, Dana , "SimpleLink™ Wi-Fi® CC3000-First Time Config Using PC", Available at http://youtube.com/watch?v=10U4NTgkjLs, retrieved on Aug. 13, 2013, Transcript of Video provided on CD Media, Dec. 18, 2012, pp. 1-2.

Myers, Dana , "SimpleLink™ Wi-Fi® CC3000-First Time Config with Smartphone", Available at http://www.youtube.com/watch?v=fxP9hnZysgo, retrieved on Aug. 13, 2013, Transcript of Video provided on CD Media, Sep. 19, 2012, pp. 1-2.

Rusty Brick, Inc. , "iPhone 4 Morse Code Transmission App", Available at http://www.rustybnck.com/ipone-morse-code.php, Jan. 4, 2011, 3 pages.

(56) References Cited

OTHER PUBLICATIONS

Texas Instruments, "CC3000 Smart Config", Availabie at http://processors.wiki.ti.com/index.php/CC3000/Smart_Config, retrieved on Sep. 26, 2013, Mar. 28, 2013, pp. 1-6.

* cited by examiner

NETWORK ACCESS COORDINATION OF LOAD CONTROL DEVICES

CROSS-REFERENCE TO RELATED APPLICATIONS

This application is a continuation of U.S. Non-Provisional application Ser. No. 16/102,357, filed on Aug. 13, 2018, which is a continuation of U.S. Non-Provisional application Ser. No. 15/011,257 filed on Jan. 29, 2016, (now U.S. Pat. No. 10,050,444, issued Aug. 14, 2018), which is a continuation of U.S. Non-Provisional application Ser. No. 13/796,486 filed on Mar. 12, 2013 (now U.S. Pat. No. 9,413,171, issued Aug. 9, 2016), which claims the benefit of commonly assigned U.S. Provisional Patent Application No. 61/745,419, filed on Dec. 21, 2012, and titled NETWORK ACCESS COORDINATION OF LOAD CONTROL DEVICES, the entire contents of all of which being hereby incorporated by reference as if fully set-forth herein, for all purposes.

BACKGROUND

A load control device may control the amount of power delivered to an electrical load. Load control devices include, for example, lighting control devices (such as wall-mounted dimmer switches and plug-in lamp dimmers), motor control devices (for motor loads), temperature control devices, motorized window treatments, and remote controls. Typically, a load control device may be coupled in a series electrical connection between an alternating-current (AC) power source and the electrical load to control the power delivered from the AC power source to the electrical load.

In some applications, the load control device may connect to a wireless network, such as a Wi-Fi network for example. Examples of Wi-Fi-enabled load control devices include those described in commonly-assigned U.S. application Ser. No. 13/538,555, filed Jun. 29, 2012, titled LOAD CONTROL DEVICE HAVING INTERNET CONNECTIVITY, the contents of which is hereby incorporated by reference herein in its entirety, for all purposes. In practice, such devices may connect to wireless network provided by a wireless network access point (AP), such as an AP provided by a home Wi-Fi router.

APs, and particularly home Wi-Fi routers, often have practical capacity limitations well below the theoretical protocol maximums. For example, a typical IP subnet might theoretically support 254 addressable devices. However, a home Wi-Fi router may only have internal memory sized to support 30 addressable devices. These practical limitations are often unnoticed, even by the most voracious Internet households. Having more than 30 Wi-Fi devices, computers, tablets, cell phones, on a household network at one time is uncommon. And, even in a commercial setting, wireless networks are routinely engineered with 10-30 users per router. The traffic generated by 10-30 commercial users often reaches the practical traffic capacity for the router.

But, it is not uncommon for a residential or commercial installation to have well over 30 load control devices. FIG. 1 offers a partial illustration of the modern residential technological environment 10. In FIG. 1, traditional network devices such as computers 18 and 46, tablets 36, smart phones 16 and 44, and printer 20, when few in number may be well served by a home Wi-Fi router 14. However, a home using Wi-Fi-enabled load control devices such as lighting load controls 12, 22, 24, 28, 32, 40, 42, and 50, motorized window treatments 26, 30, and 38, smart thermostats 34 and 48, and the like, may have a total number of devices vying for network access from the home Wi-Fi router 14 that may well exceed the router's capacity.

SUMMARY

An apparatus, such as a dimmer switch, may control the power delivered from an AC power source to at least one electrical load, such as one or more lights. The apparatus may comprise a controllably conductive device adapted to be coupled in series electrical connection between the source and the one or more lights. The apparatus may also comprise a controller that may be operatively coupled to a control input of the controllably conductive device. The apparatus may also include a first wireless communication circuit that may communicate via a first protocol and may be used to join a first wireless communication network. The first wireless communication network may communicate via the first protocol. The first wireless communication circuit may be in communication with the controller. The controller may control the controllably conductive device for rendering the controllably conductive device conductive and non-conductive, perhaps to increase and/or decrease the intensity of the one or more lights. The controller may also determine a first condition for communicating via the first protocol. The controller may control the first wireless communication circuit to join the first wireless communication network when the first condition being is.

An apparatus, such as a remote control device or an occupancy sensor, may be configured to provide information for the control of power delivered to at least one electrical load, such as sending commands to dimmer switches. The apparatus may comprise a controller and a sensor (e.g. for the occupancy sensor) or a manual operator (e.g., for the remote control device). Either the sensor and/or the manual operator may be in communication with the controller. The apparatus may further comprise a first wireless communication circuit that may communicate via a first protocol and may join a first wireless communication network. The first wireless communication network may be operable for communication via the first protocol. And the first wireless communication circuit may communicate with the controller. The controller may determine the information based at least in part on a signal received from either the sensor and/or the manual operator. The controller may also determine a first condition for communicating via the first protocol. And the controller may also control the first wireless communication circuit to join the first wireless communication network when the first condition is satisfied.

An apparatus may control the power delivered to at least one electrical load. The apparatus may comprise a controller and a first wireless communication circuit that may be operable to communicate via a first protocol and to join a first wireless communication network that may be operable to communicate via the first protocol. The first communication circuit may be in communication with the controller. The apparatus may also comprise a second communication circuit operable to communicate via a second protocol. The second communication circuit may be in communication with the controller. The controller may be operable to determine a first condition for communicating via the first protocol. The first condition may include a receipt of a signal via the second communication circuit and via the second protocol to join the first wireless communication network. The controller may also be operable to control the first wireless communication circuit to join the first wireless communication network upon the first condition being satisfied.

A network node may be in communication with a load control device. The load control device may control the power delivered to at least one electrical load. The load control device may comprise a first controller. The load control device may also comprise a first wireless communication circuit that may be operable to communicate via first protocol and may be operable to join a first wireless communication network. The load control device may also comprise a second communication circuit that may be operable to communicate via a second protocol. The network node may comprise a second controller and a third communication circuit that may be operable to communicate via the second protocol. The third communication circuit may be in communication with the second controller. The second controller may be operable to determine a first condition for the load control device to communicate via the first protocol. The second controller may also be operable to send a first signal via the third communication circuit and via the second protocol to the load control device upon the first condition being satisfied. The first signal may cause the load control device to control the first wireless communication circuit to join the first wireless communication network.

A wireless control device may be used in a load control system to control power delivered from a power source to an electrical load. The wireless control device may comprise a first wireless communication circuit that may be configured to communicate digital messages via a first wireless communication network. The wireless device may comprise a control circuit that may be in communication with the first wireless communication circuit. The control circuit may be configured to join the first wireless communication network. The control circuit may be configured to communicate digital messages via the first wireless communication network using a first protocol. The control circuit may be configured to determine an occurrence of a first condition. The control circuit may be configured to join the first wireless communication network upon the first condition being satisfied. The control circuit may be configured to determine an occurrence of a second condition. The control circuit may be configured to disconnect from the first wireless communication network upon the second condition being satisfied.

DETAILED DESCRIPTION

Figure 1:
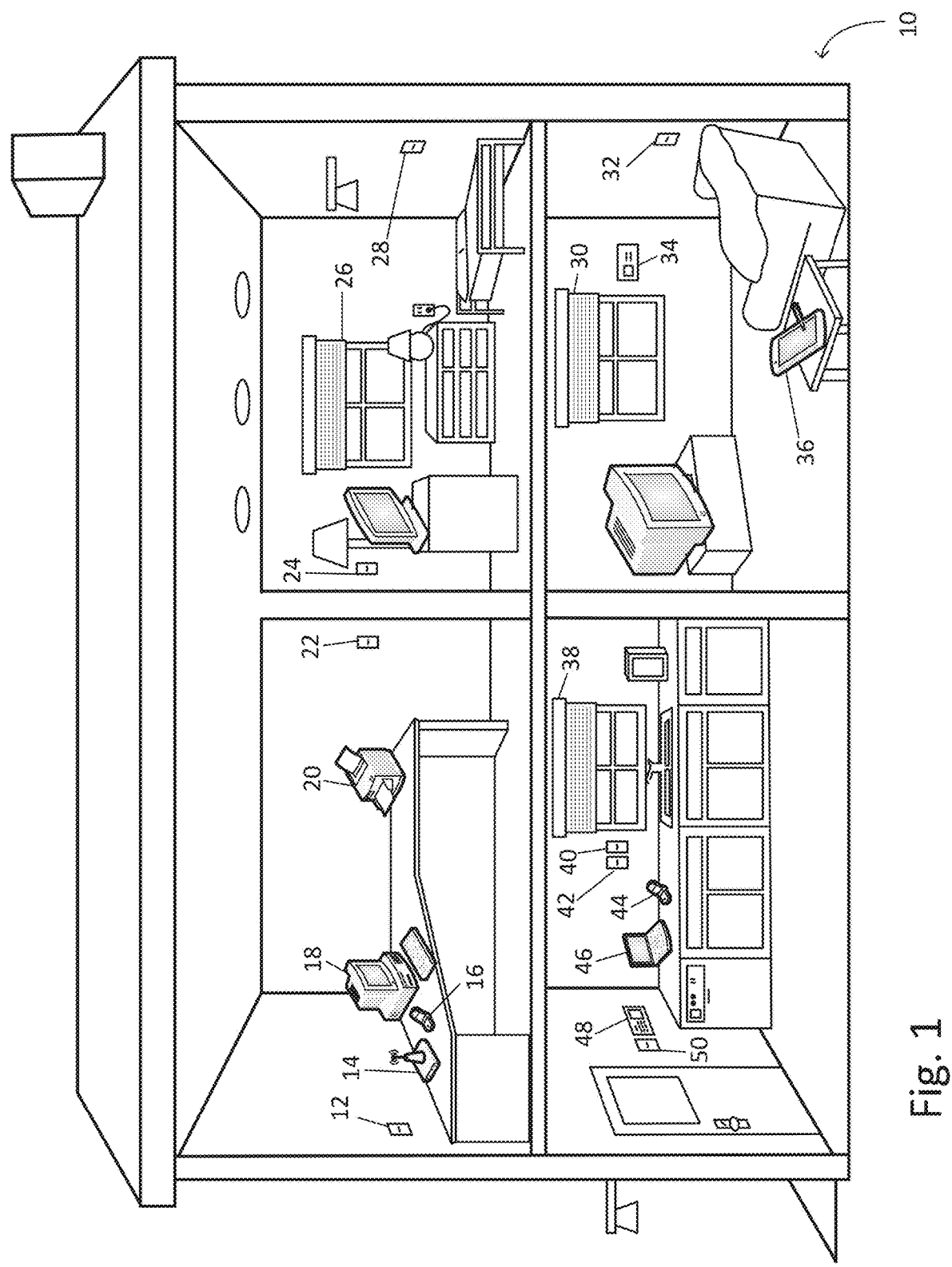
FIG. 1 is an example environment that may utilize a number of contemplated load control devices, sensors, and/or remote control devices.
Figure 2:
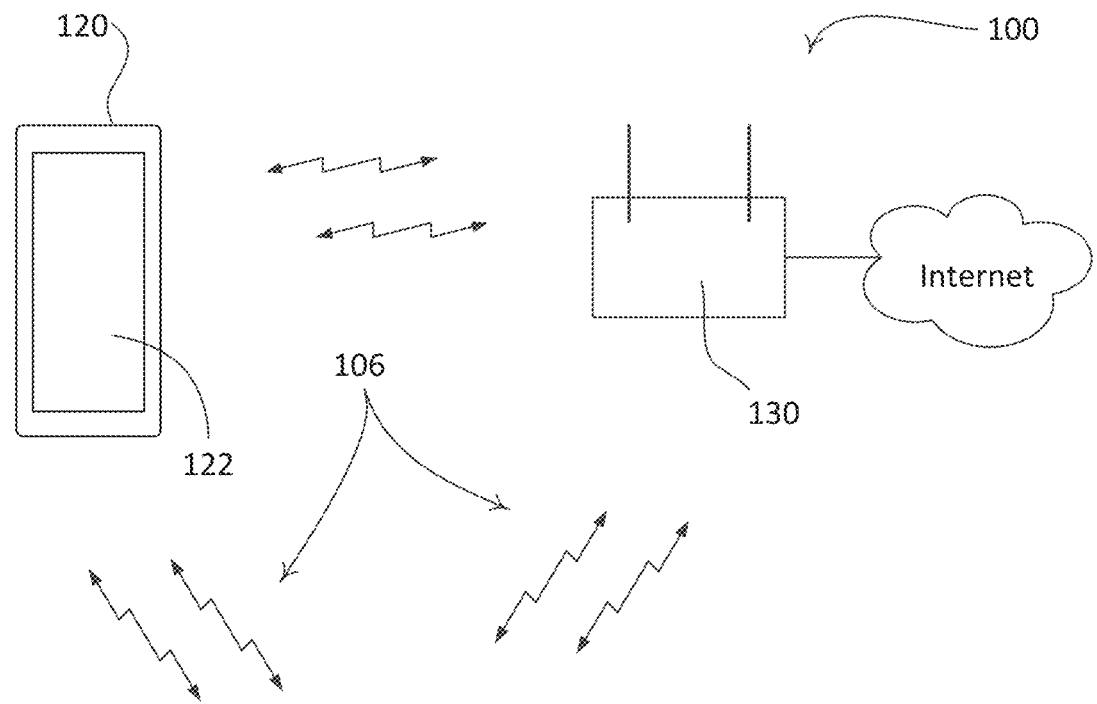
FIG. 2 is a simple diagram of a radio-frequency (RF) lighting control system comprising a dimmer switch and a wireless control device, such as a smart phone.
Figure 2:
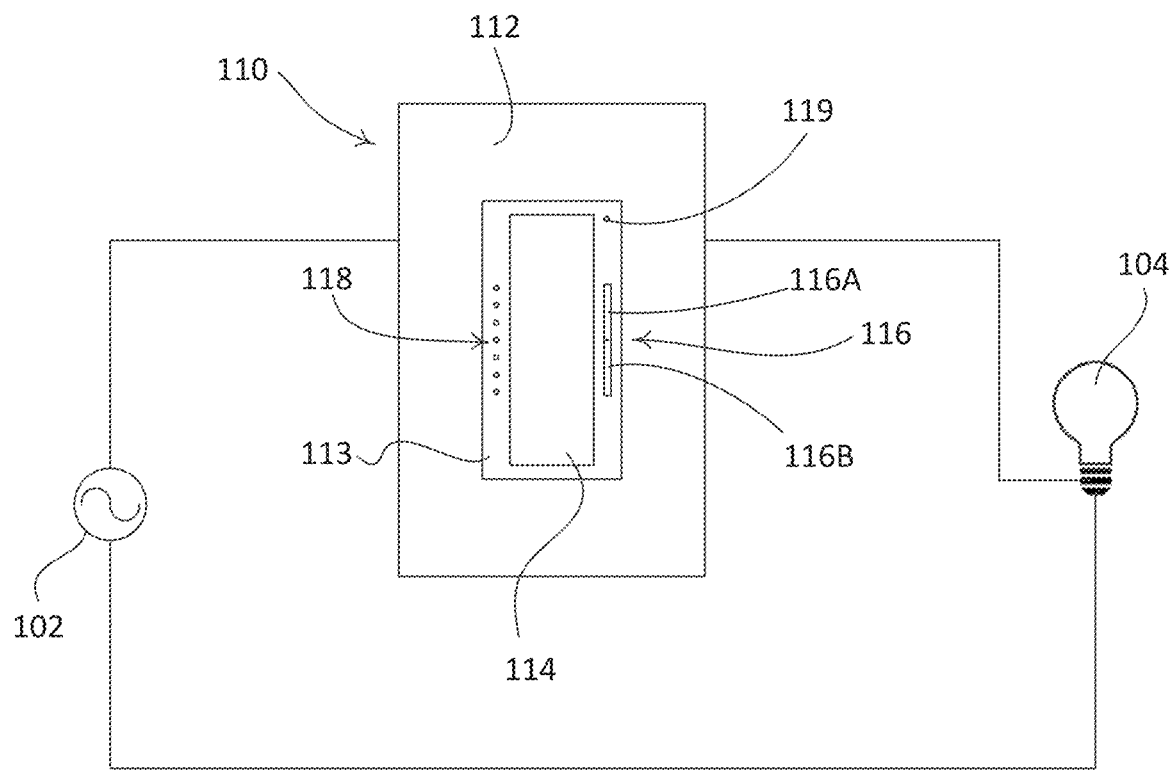

FIG. 2 is a simple diagram of a radio-frequency (RF) lighting control system 100 that may include a dimmer switch 110 and a wireless control device 120. The wireless control device 120 may be any device capable of performing wireless communications, such as, a smart phone (e.g., an iPhone® smart phone, an Android® smart phone, or a Blackberry® smart phone), a personal computer, a laptop, a wireless-capable media device (e.g., MP3 player, gaming device, or television), or a tablet device, (for example, an iPad® hand-held computing device), a Wi-Fi or wireless-communication-capable television, or any other suitable Internet-Protocol-enabled device.

The wireless control device 120 may be operable to transmit digital messages to the dimmer switch 110 in one or more Internet Protocol (IP) packets. The Internet Protocol layer is responsible for addressing hosts and routing datagrams (i.e., packets) from a source host to a destination host across one or more IP networks. For this purpose, the Internet Protocol layer defines an addressing system that has two functions: identifying hosts and providing a logical location service. This is accomplished by defining standard datagrams and a standard addressing system.

Each datagram has two components, a header and a payload. The IP header includes the source IP address, destination IP address, and other meta-data needed to route and deliver the datagram. The payload is the data that is transported.

The wireless control device 120 may transmit the digital messages (e.g., IP packets) via RF signals 106 either directly or via a wireless network that includes a standard wireless router 130. For example, the wireless control device 120 may transmit the RF signals 106 directly to the dimmer switch 110 via a point-to-point communication link, e.g., a Wi-Fi communication link, such as an 802.11 wireless local area network (LAN), or other direct wireless communication link, such as a Wi-MAX communication link or a Bluetooth® communication link. This point-to-point communication may be performed using a standardized communication, e.g., Wi-Fi Direct communication, or any non-standardized communication that allows a wireless device to connect to another wireless device without the use of a wireless access point. For example, the wireless control device 120 and/or the dimmer switch 110 may download a software access point (AP) that provides a protected wireless communication between the devices.

The wireless control device 120 may also transmit RF signals 106 to the dimmer switch 110 via the wireless network (i.e., via the wireless router 130). The wireless network may enable wireless communications via one or more wireless communications links, e.g., a Wi-Fi communications link, a Wi-MAX communications link, a Bluetooth® communications link, a cellular communications link, a television white space (TVWS) communication link, or any combination thereof. For example, the wireless control device 120 may communicate with a network server via a first wireless communications link (e.g., a cellular communications link), while the dimmer switch 110 communicates with the network server via a second communications link (e.g., a Wi-Fi communications link). Alternatively or additionally, the wireless control device 120 and the dimmer switch 110 may communicate with the network via the same type of communication link. The lighting control system 100 may also include a femtocell, a Home Node B, and/or other network entity for facilitating the configuration and operation of the lighting control system and for allowing wireless communications and connection to the Internet.

The dimmer switch 110 may be coupled in series electrical connection between an AC power source 102 and a lighting load 104 for controlling the amount of power delivered to the lighting load. The dimmer switch 110 may be wall-mounted in a standard electrical wallbox, or alternatively implemented as a table-top load control device. The dimmer switch 110 comprises a faceplate 112 and a bezel 113 received in an opening of the faceplate. The dimmer switch 110 further comprises a toggle actuator 114 and an intensity adjustment actuator 116. Actuations of the toggle actuator 114 toggle, e.g., alternatingly turn off and on, the lighting load 104. Actuations of an upper portion 116A or a lower portion 116B of the intensity adjustment actuator 116 may respectively increase or decrease the amount of power delivered to the lighting load 104 and thus increase or decrease the intensity of the lighting load 104 from a minimum (i.e., low-end) intensity (e.g., approximately 1-10%) to a maximum (i.e., high-end) intensity (e.g., approximately 100%). A plurality of visual indicators 118, e.g., light-emitting diodes (LEDs), may be arranged in a linear array on the left side of the bezel 113. The visual indicators 118 are illuminated to provide visual feedback of the intensity of the lighting load 104. An example of a dimmer switch having a toggle actuator and an intensity adjustment actuator is described in greater detail in U.S. Pat. No. 5,248,919 ("the 919 patent"), issued Sep. 28, 1993, entitled LIGHTING CONTROL DEVICE, the entire disclosure of which is hereby incorporated by reference. Alternatively, the dimmer switch 110 could be replaced by an electronic switch for simply turning the lighting load 104 on and off. The electronic switch may include a single visual indicator, e.g., the middle indicator of the visual indicators 118 of the dimmer switch 110.

The dimmer switch 110 may include an optical receiver 119. The optical receiver 119 may be used to receive optical signals from the wireless control device 120. Optical signals may be free-space optical communications or communications via physical connections. For example, free space optical communications may include communications via air, while physical optical communications may include communications via optical fiber cable or an optical transmission pipe. The optical signals may also be included in visible light, e.g., a flashing light, or non-visible light, e.g., infrared, spectrums.

The optical signals may provide instructions for programming and/or adjusting the operating parameters (e.g., the low-end intensity and the high-end intensity) of the dimmer switch 110. For example, the optical signals may be used to configure the dimmer switch such that the dimmer switch 110 is operable to receive the RF signals 106 from the wireless control device 120 as will be described in greater detail below. The optical signals may also be used to control or program the lighting configurations of the dimmer switch 110. And, though devices and techniques described herein may be described with respect to using optical signals or other signals to program or control a dimmer switch from a wireless control device, such signals may be used to program or control any device that is capable of receiving instructions via such optical or other signals, such as shades, thermostats, plug-in devices, or the like. Examples of methods of communicating optical signals between the dimmer switch 110 and the wireless control device 120 are described in greater detail in commonly assigned U.S. patent application Ser. No. 13/538,665, filed on Jun. 29, 2012, titled METHOD OF OPTICALLY TRANSMITTING DIGITAL INFORMATION FROM A SMART PHONE TO A CONTROL DEVICE, the entire disclosure of which is hereby incorporated by reference.

Wireless load control devices are described in greater detail in commonly-assigned U.S. Pat. No. 5,838,226, issued Nov. 17, 1998, entitled COMMUNICATION PROTOCOL FOR TRANSMISSION SYSTEM FOR CONTROLLING AND DETERMINING THE STATUS OF ELECTRICAL DEVICES FROM REMOTE LOCATIONS; U.S. Pat. No. 6,803,728, issued Oct. 12, 2004, entitled SYSTEM FOR CONTROL OF DEVICES; U.S. patent application Ser. No. 12/033,223, filed Feb. 19, 2008, entitled COMMUNICATION PROTOCOL FOR A RADIO-FREQUENCY LOAD CONTROL SYSTEM; and U.S. patent application Ser. No. 13/234,573, filed Sep. 16, 2011, entitled DYNAMIC KEYPAD FOR CONTROLLING ENERGY-SAVINGS SETTINGS OF A LOAD CONTROL SYSTEM; the entire disclosures of which are hereby incorporated by reference.

The wireless control device 120 has a visual display 122, which may comprise a touch screen having, for example, a capacitive touch pad displaced overtop the visual display, such that the visual display may display soft buttons that may be actuated by a user. Alternatively, the wireless control device 120 may comprise a plurality of hard buttons (e.g., physical buttons or manual operators) in addition to the visual display 122. The wireless control device 120 may download a product control application for allowing the user to control the lighting load 104. In response to actuations of the displayed soft buttons or hard buttons, the wireless control device 120 transmits digital messages to the dimmer switch 110 directly or through other wireless communications described herein. For example, the digital messages may be transmitted via Wi-Fi communication using the wireless router 130. The dimmer switch 110 may adjust the intensity of the lighting load 104 in response to commands included in the digital messages, such that the dimmer switch controls the lighting load in response to actuations of the soft buttons or hard buttons of the wireless control device 120.

In addition, the wireless control device 120 may be controlled to transmit optical signals, near field communication (NFC) signals, or RF signals according to a proprietary RF communication protocol (such as, for example, the Clear Connect™ protocol) as described herein. For example, the visual display 122 may be controlled to transmit optical signals to the optical receiver 119 of the dimmer switch 110 (as will be described in greater detail below).

The dimmer switch 110 and the wireless control device 120 may both be assigned a unique address for wireless communications via the wireless network (i.e., via the wireless router 130) as described herein. For example, where wireless communications are performed using a Wi-Fi communication link, a Media Access Control (MAC) address may be assigned (e.g., during manufacture). The wireless control device 120 may connect to the wireless LAN via the wireless router 130 using standard procedures. The wireless control device 120 is assigned an Internet Protocol (IP) address upon connecting to the wireless LAN. The wireless control device 120 may store the service set identifier (SSID) and the SSID password of the wireless LAN. After obtaining the IP address, the wireless control device 120 is able to assign an IP address (e.g., different from the IP address of the wireless control device 120) to the dimmer switch 110. Alternatively, the dimmer switch 110 may be operable to obtain the IP address from the wireless router 130 using, for example, procedures defined by the Wi-Fi Protected Setup standard.

The dimmer switch 110 may be associated with (e.g., assigned to) the wireless control device 120, such that the wireless control device may transmit commands for controlling the intensity of the lighting load 104 or programming the dimmer switch 110. Such commands may be transmitted to the dimmer switch 110 via the RF signals 106. Digital messages transmitted to and from the dimmer switch 110 may include, for example, the MAC address and the IP address of the dimmer switch 110. The dimmer switch 110 is operable to turn the lighting load 104 on and off. The dimmer switch 110 is also operable to adjust the intensity of the lighting load in response to received digital messages, including the MAC address and the IP address of the dimmer switch, for example. In addition, the wireless router 130 may be operable to receive commands for controlling the lighting load 104 from the Internet, and may wirelessly transmit corresponding digital messages to the dimmer switch 110.

The dimmer switch 110 may be assigned an IP address, an SSID, an SSID password, and/or a software AP at manufacture, such that the dimmer switch 110 may act as an AP for other communication devices in a LAN. The wireless control device 120 may recognize the dimmer switch 110 as an AP and may connect to the LAN via the dimmer switch 110. For example, the dimmer switch 110 may connect to router 130 or may perform the functions of the router 130 itself.

The dimmer switch 110 may also connect to the wireless LAN to discover other dimmer switches (not shown). The dimmer switch 110 may discover the other dimmer switches using any discovery protocol, such as Bonjour, Simple Service Discovery Protocol (SSDP), Bluetooth® Service Discovery Protocol (SDP), DNS service discovery (DNS-SD), Dynamic Host Configuration Protocol (DHCP), Internet Storage Name Service (iSNS), Jini for Java objects, Service Location Protocol (SLP), Session Announcement Protocol (SAP) for RTP sessions, Simple Service Discovery Protocol (SSDP) for Universal Plug and Play (UPnP), Universal Description Discovery and Integration (UDDI) for web services, Web Proxy Autodiscovery protocol (WPAD), Web Services Dynamic Discovery (WS-Discovery), XMPP Service Discovery (XEP-0030), and/or XRDS for XRI, OpenID, OAuth, etc. Upon the dimmer switch 110 discovering one or more other dimmer switches, the dimmer switch may create a peer-to-peer network of dimmer switches capable of communicating with one another. For example, the dimmer switches may communicate programming and/or control instructions received from the wireless control device 120.

The wireless control device 120 may control the lighting load 104 by communicating instructions to the dimmer switch 110 via the RF signals 106 that cause the dimmer switch 110 to execute control instructions that have been pre-programmed on the dimmer switch 110. For example, the dimmer switch 110 may be pre-programmed at manufacture or via an update to execute the control instructions. The control instructions may include pre-configured settings (e.g., protected or locked lighting presets), instructions for raising/lowering lighting level, instructions for fading, instructions for scheduling, instructions for turning lights on/off, or any other pre-programmed instruction, for example.

The wireless control device 120 may also program the settings (i.e., the operating parameters) of the dimmer switch 110 (e.g., when the dimmer switch is in a programming mode). For example, the dimmer switch 110 may be a dimmer switch that may have a limited user interface (UI) or may not have any user interface. As such, the user interface of the wireless control device 120 may be used to program the dimmer switch 110. For example, various wireless communication links described herein, e.g., Wi-Fi signals, optical signals, near field communication (NFC) signals, or proprietary-protocol RF signals, may be used to program any of a number of programmable features provided by the dimmer switch 110. Such features may be selected via the wireless control device 120. For example, the wireless control device 120 may program the dimmer switch 110 with such features as protected or locked presets, high-end trim, low-end trim, adjustable delay, fade time, load type, performing communications via wireless communication modes (e.g., as described herein), or being compatible with different lamps. In addition, the wireless control device 120 may be operable to program the dimmer switch 110 to change between modes of operation, for example, between a switching mode, a dimming mode, and/or an electronic timer mode (i.e., a countdown timer mode). The programming signal may be a one-way or two-way serial communication with the dimmer switch 110. Examples of method of programming the dimmer switch 110 using the wireless control device 120 are described in greater detail in commonly assigned U.S. patent application Ser. No. 13/538,615, filed Jun. 29, 2012, titled METHOD OF PROGRAMMING A LOAD CONTROL DEVICE USING A SMART PHONE, the entire disclosure of which is hereby incorporated by reference.

Figure 3A:
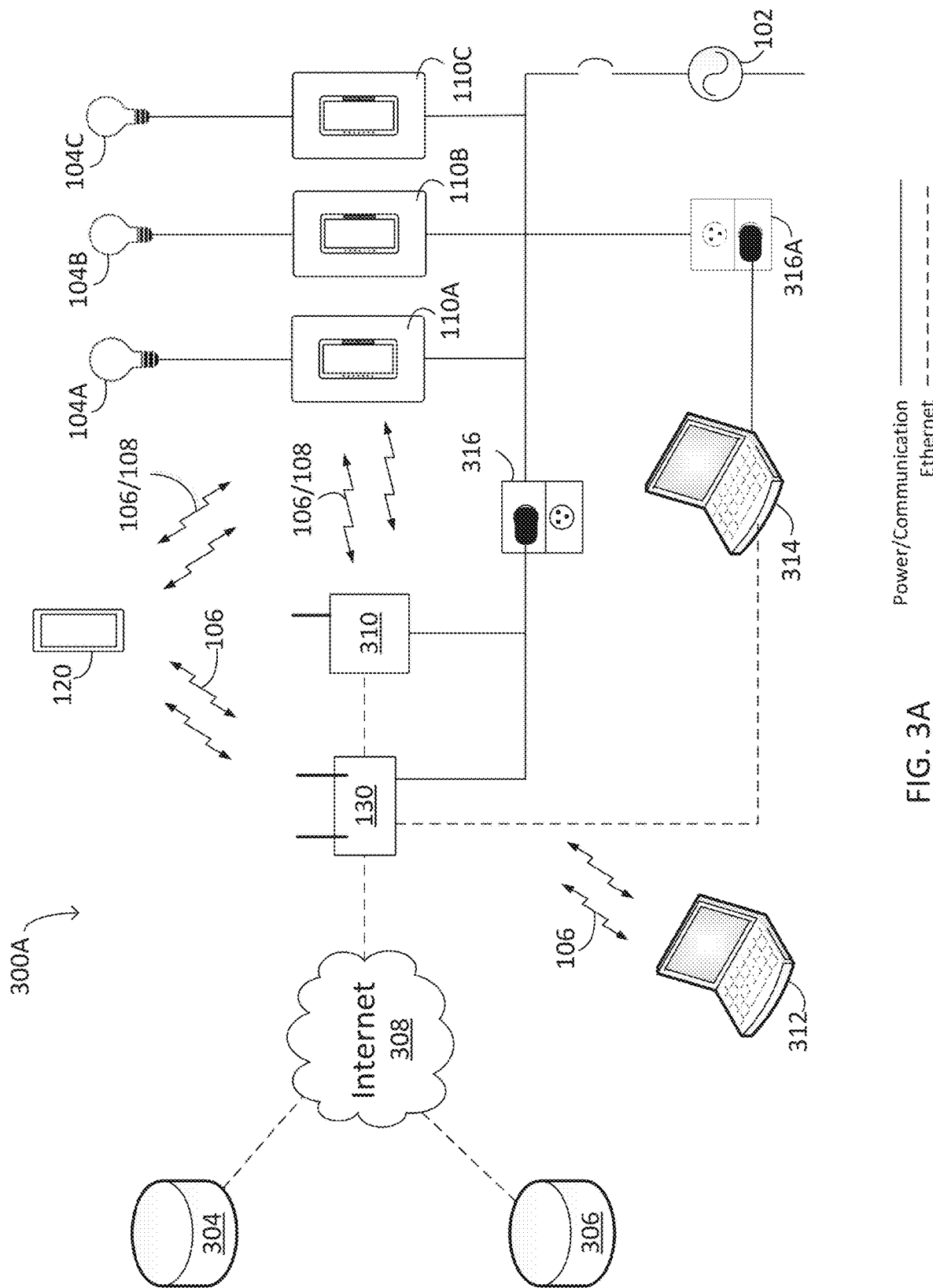
FIG. 3A is a diagram of a first example network in which one or more contemplated devices and techniques may be employed.

FIG. 3A is a diagram of an exemplary network environment 300A. In FIG. 3A, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). In some configurations, a gateway device 310 may communicate with the router 130 via a wired or wireless connection. Any number of devices in FIG. 3A, such as, for example, the router 130, the gateway device 310, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A lighting load 104B, and/or lighting load 104C, respectively, as described previously herein. Occupancy sensor 180 may communicate with the router 130 and/or dimmer switches 110A, 110B, and/or 110C, perhaps to adjust the intensity of one or more of the dimmer switches 110A, 110B, and/or 110C based on a detected occupancy of the environment 300A. A user may activate one or more of the buttons (soft buttons or hard buttons (e.g. physical buttons or manual operators)) on a remote control device 184, which may communicate with the router 130 and/or dimmer switches 110A, 110B, and/or 110C to adjust the intensity of one or more of the dimmer switches 110A, 110B, and/or 110C. And a user may override the occupancy sensor's 180 control of the dimmer switches 110A, 110B, and/or 110C, for example.

The router 130 may establish a non-public (or private) IP address for the router 130 and may establish an IP connection and corresponding respective private IP addresses with the dimmer switch 110A, 110B, and/or 110C, the gateway device 310, and the laptops 312 and/or 314. The router 130 may coordinate one or more of the respective private IP addresses with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data streams) that are sent to the router's 130 private IP address (e.g., from the gateway device 310, laptop 312, and/or laptop 314). The router 130 may perform such coordination via a Network Address Table (NAT) (not shown), or the like, for example.

The wireless control device 120, the occupancy sensor 180, and/or the remote control device 184 may be operable to transmit and receive RF signals 106 including Internet Protocol packets directly to dimmer switches 110A, 110B, and/or 110C, or to dimmer switches 110A, 110B, and/or 110C via the wireless router 130 (and perhaps also via the gateway device 310). The router 130 (and perhaps the gateway device 310) may be operable to transmit one or more digital messages via RF signals 106 that may correspond to the RF signals 106 received from the wireless control device 120, the occupancy sensor 180, and/or the remote control device 184. The one or more digital messages may be transmitted according to a proprietary RF communication protocol (such as, for example, the Clear Connect™ protocol) to the dimmer switch 110A, dimmer switch 110B, and/or dimmer switch 110C via RF signals 108. The dimmer switch 110A, dimmer switch 110B and/or dimmer switch 110C may include a wireless communication module (e.g. circuit) operable to receive digital messages according to the proprietary RF communication protocol via the RF signals 108. For example, the wireless control device 120, the occupancy sensor 106, the remote control device 184, the router 130, the laptop 312, and/or the laptop 314 may transmit the RF signals 106 directly to the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link.

In FIG. 3A, a communication dongle (not shown) could be connected to the wireless control device 120 that may allow for direct communication between the wireless control device 120 and the dimmer switch 110A, dimmer switch 110B, and/or dimmer switch 110C using the proprietary RF communication protocol via RF signals 108. For example, the communication dongle could be plugged into a headphone jack on the wireless control device 120, or a USB port on 120. The occupancy sensor 180 and/or the remote control device 184 may communicate with the dimmer switches 110A, 110B, and/or 110C using the proprietary RF communication protocol via RF signals 108.

Figure 3B:
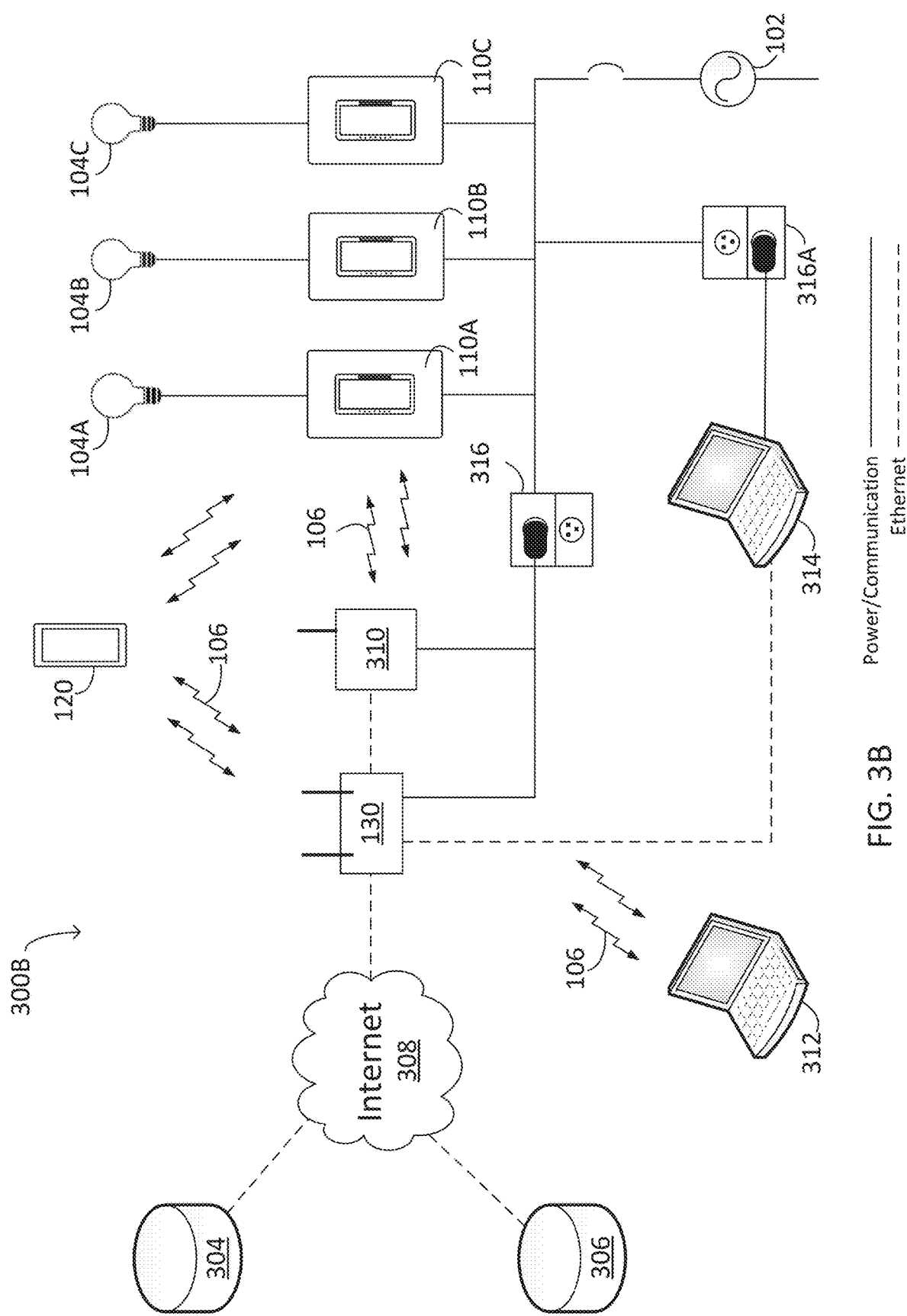
FIG. 3B is a diagram of a second example network in which one or more contemplated devices and techniques may be employed.

FIG. 3B is a diagram of an exemplary network environment 300B. In FIG. 3B, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). A gateway device 310 may communicate with the router 130 via a wired or wireless connection. Any number of devices in FIG. 3B, such as, for example, the router 130, the gateway device 310, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A lighting load 104B, and/or lighting load 104C as described previously herein. Occupancy sensor 180 may communicate with the router 130 and/or dimmer switches 110A, 110B, and/or 110C, perhaps to adjust the intensity of one or more of the dimmer switches 110A, 110B, and/or 110C based on a detected occupancy of the environment 300B. A user may activate one or more of the buttons (soft buttons or hard buttons (e.g. physical buttons or manual operators)) on the remote control device 184, which may communicate with the router 130 and/or dimmer switches 110A, 110B, and/or 110C to adjust the intensity of one or more of the dimmer switches 110A, 110B, and/or 110C. And a user may override the occupancy sensor's 180 control of the dimmer switches 110A, 110B, and/or 110C, for example.

The router 130 may establish a non-public (or private) IP address for the router 130 and may establish an IP connection and corresponding respective private IP addresses with the dimmer switches 110A, 110B, and/or 110C, the gateway device 310, and the laptop 312 and/or the laptop 314. The router 130 may coordinate one or more of the respective private IP addresses with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data streams) that are sent to the router's 130 private IP address (e.g., from the gateway device 310, laptop 312, and/or laptop 314). The router 130 may perform such coordination via a Network Address Table (NAT) (not shown), or the like, for example.

The wireless control device 120, the occupancy sensor 180, and/or the remote control device 184 may be operable to transmit and receive RF signals 106 including Internet Protocol packets directly to and from dimmer switches 110A, 110B, and/or 110C, or to amd from the dimmer switches 110A, 110B, and/or 110C via the wireless router 130 (and perhaps also via the gateway device 310). The router 130 (and perhaps the gateway device 310) may be operable to transmit one or more digital messages via RF signals 106 that may correspond to the RF signals 106 received from the wireless control device 120, the occupancy sensor 180, and/or the remote control device 184. For example, the wireless control device 120, the occupancy sensor 106, the remote control device 184, the router 130, the laptop 312, and/or the laptop 314 may transmit the RF signals 106 directly to the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link.

The wireless control device 120, the wireless router 130, and the gateway device 310, the occupancy sensor 180, and/or the remote control device 184 may communicate with the laptop 314, dimmer switch 110A, dimmer switch 110B, and/or dimmer switch 110C via one or more devices that have a private IP address and are connected to the AC powers source 102 via an Ethernet IP based protocol (e.g., the TCP/IP and/or "HomePlug" protocols) that may be carried via the conductors that deliver electrical energy from the AC power source 102 to the various devices (e.g., router 130, gateway device 310, dimmer switch 110A, dimmer switch 110B, dimmer switch 110C, and/or laptop 314). The gateway device 310, the occupancy sensor 180, the remote control device 184, and the dimmer switches 110A, 110B, and/or 110C (and perhaps the occupancy sensor 180 and the remote control device 184) may also transmit, receive, and/or interpret energy pulses that may be used to convey signals and/or information via the conductors may deliver electrical energy from the AC power source 102 to the gateway device 310 and the dimmer switches 110A, 110B, and/or 110C (and perhaps the occupancy sensor 180 and the remote control device 184).

Figure 3C:
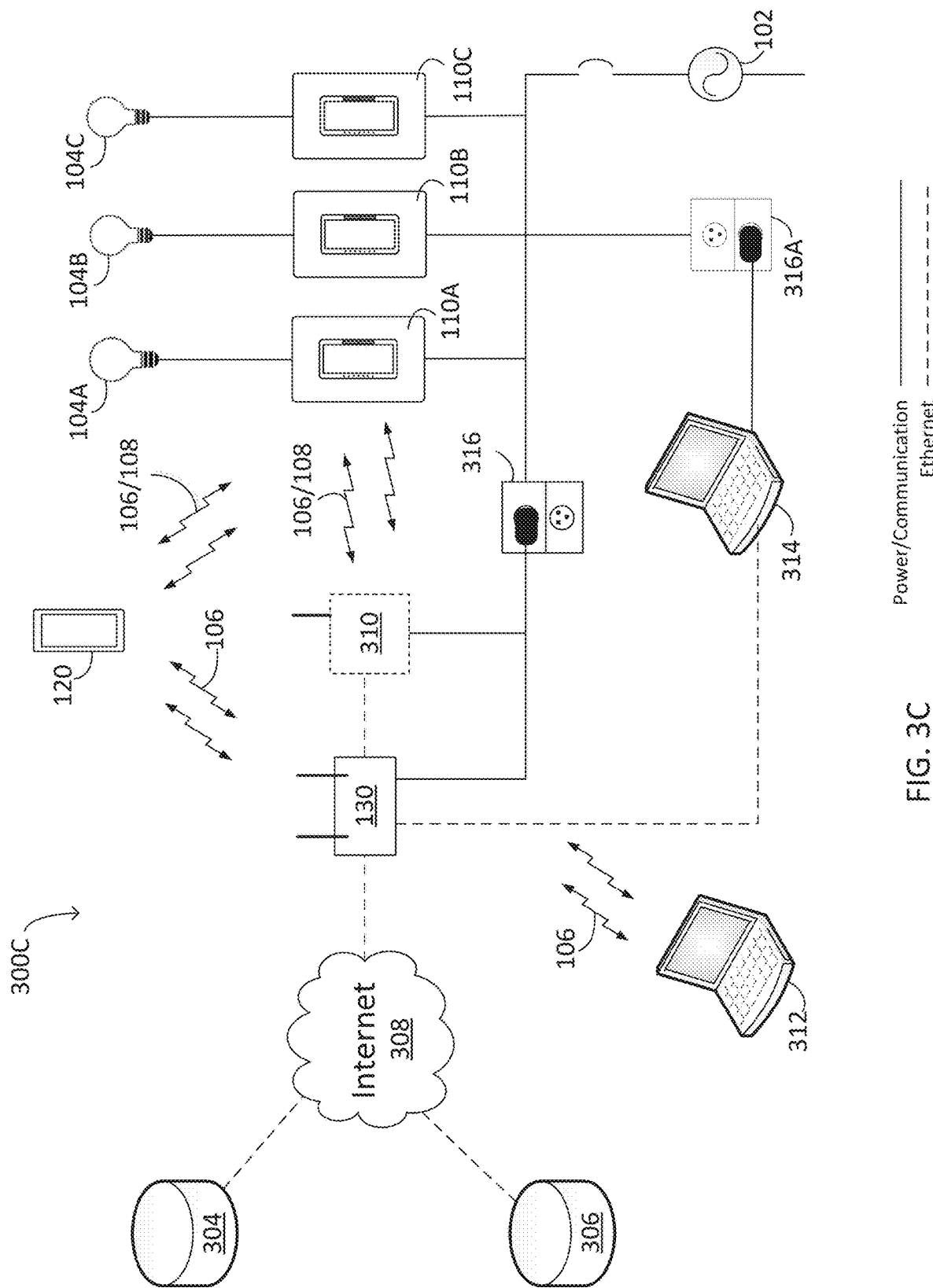
FIG. 3C is a diagram of a third example network in which one or more contemplated devices and techniques may be employed.

FIG. 3C is a diagram of an exemplary network environment 300C. In FIG. 3C, the router 130 may communicate with one or more servers 304, 306 via the Internet 308, perhaps as accessed through the "cloud." For example, router 130 may establish at least one Internet Protocol (IP) connection with either server 304 and/or 306. The at least one IP connection between the router 130 and either server 304 and/or 306 may be made via a router's 130 public IP address (and the respective public IP addresses of server 304 and/or server 306). A gateway device 310 may communicate with the router 130 via a wired or wireless connection. Any number of devices in FIG. 3C, such as, for example, the router 130, the gateway device 310, laptop 314, dimmer switch 110A, dimmer switch 110B, and/or dimmer switch 110C, among other devices, may be connected to the AC power supply 102, perhaps via a hardwired connection or via electrical outlets 316 and 316A, for example. Dimmer switch 110A, dimmer switch 110B, and/or dimmer switch 110C may operate lighting load 104A lighting load 104B, and/or lighting load 104C as described previously herein. Occupancy sensor 180 may communicate with the router 130 and/or dimmer switches 110A, 110B, and/or 110C, perhaps to adjust the intensity of one or more of the dimmer switches 110A, 110B, and/or 110C based on a detected occupancy of the environment 300C. A user may activate one or more of the buttons (soft buttons or hard buttons (e.g., physical buttons or manual operators)) on the remote control device 184, which may communicate with the router 130 and/or dimmer switches 110A, 110B, and/or 110C to adjust the intensity of one or more of the dimmer switches 110A, 110B, and/or 110C. And a user may override the occupancy sensor's 180 control of the dimmer switches 110A, 110B, and/or 110C by activating one or more of the buttons of the remote control device 184, for example.

The router 130 may establish a non-public (or private) IP address for the router 130 and may establish an IP connection and corresponding respective private IP addresses with the gateway device 310, the laptop 312 and/or the laptop 314. The router 130 may coordinate one or more of the respective private IP addresses with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data streams) that are sent to the router's 130 private IP address (e.g., from the gateway device 310, laptop 312, and/or laptop 314). The router 130 may perform such coordination via a Network Address Table (NAT) (not shown), or the like, for example.

The wireless control device 120, the occupancy sensor 180, and/or the remote control device 184 may be operable to transmit and receive RF signals 106 including Internet Protocol packets directly to dimmer switches 110A, 110B, and/or 110C, or to dimmer switches 110A, 110B, and/or 110C via the gateway device 310 (and perhaps via the wireless router 130). The gateway device 310 may be operable to transmit one or more digital messages via RF signals 106 that may correspond to the RF signals 106 received from the wireless control device 120, the occupancy sensor 180, and/or the remote control device 184 (perhaps via the router 130). The one or more digital messages may be transmitted according to a proprietary RF communication protocol (such as, for example, the Clear Connect™ protocol) to the dimmer switch 110A, dimmer switch 110B, and/or dimmer switch 110C via RF signals 108. The dimmer switch 110A, dimmer switch 110B and/or dimmer switch 110C may include a wireless communication module (e.g. circuit) operable to receive digital messages according to the proprietary RF communication protocol via the RF signals 108. The gateway device 310 (and perhaps the router 130) may communicate with the laptop 314, dimmer switch 110A, dimmer switch 110B, and/or dimmer switch 110C via an Ethernet based IP protocol (e.g., TCP/IP and/or "HomePlug" protocols) that may be carried via the conductors that deliver electrical energy from the AC power source 102 to the various devices such as the router 130, the gateway device 310, laptop 314, dimmer switch 110A, dimmer switch 110B, and/or dimmer switch 110C, among other devices illustrated in FIG. 3C.

In FIG. 3C, a communication dongle (not shown) could be connected to the wireless control device 120 that may allow for direct communication between the wireless control device 120 and the dimmer switch 110A, dimmer switch 110B, and/or dimmer switch 110C using the proprietary RF communication protocol via RF signals 108. For example, the communication dongle could be plugged into a headphone jack on the wireless control device 120, or a USB port on 120. The occupancy sensor 180 and/or the remote control device 184 may communicate with the dimmer switches 110A, 110B, and/or 110C using the proprietary RF communication protocol via RF signals 108.

The router 130 may further establish IP connections and corresponding respective private IP addresses with the occupancy sensor 180, remote control device 184, dimmer switch 110A, 110B, and/or 110C. In such situations, the router 130 may coordinate one or more of the respective private IP addresses of the occupancy sensor 180, remote control device 184, dimmer switch 110A, dimmer switch 110B, and/or dimmer switch 110C with one or more IP connections (e.g., multimedia or data streams) that are received via the router's 130 public IP address (e.g., from the server 304 and/or 306). The router 130 may coordinate one or more of the respective public IP addresses (e.g., of the server 304 and/or server 306) with one or more IP connections (e.g., multimedia or data streams) that are sent to the router's 130 private IP address (e.g., from the occupancy sensor 180, remote control device 184, dimmer switch 110A, dimmer switch 110B, and/or dimmer switch 110C).

When dimmer switch 110A, dimmer switch 110B, and/or dimmer switch 110C may be assigned private IP addresses, the wireless control device 120, the occupancy sensor 180, and/or the remote control device 184 (among other devices with private IP addresses) may transmit RF signals 106 including Internet Protocol packets to the dimmer switch 110A, dimmer switch 110B, and/or dimmer switch 110C. For example, the wireless control device 120, the occupancy sensor 106, the remote control device 184, the router 130, the laptop 312, and/or the laptop 314 may transmit the RF signals 106 directly to the dimmer switch 110A, dimmer switch 110B, and/or dimmer switch 110C via a point-to-point communication, such as a Wi-Fi communication link, e.g., an 802.11 wireless local area network (LAN), or other direct wireless communication link, e.g., a Wi-MAX communication link or a Bluetooth® communication link. The wireless control device 120, the occupancy sensor 180, and/or the remote control device 184 may communicate with the laptop 314, dimmer switch 110A, dimmer switch 110B, and/or dimmer switch 110C via one or more devices that have a private IP address and are connected to the AC powers source 102 via an Ethernet IP based protocol (e.g., the TCP/IP and/or "HomePlug" protocols) that may be carried via the conductors that deliver electrical energy from the AC power source 102 to the various devices (e.g., router 130, gateway device 310, dimmer switch 110A, dimmer switch 110B, dimmer switch 110C, and/or laptop 314).

Figure 4A:
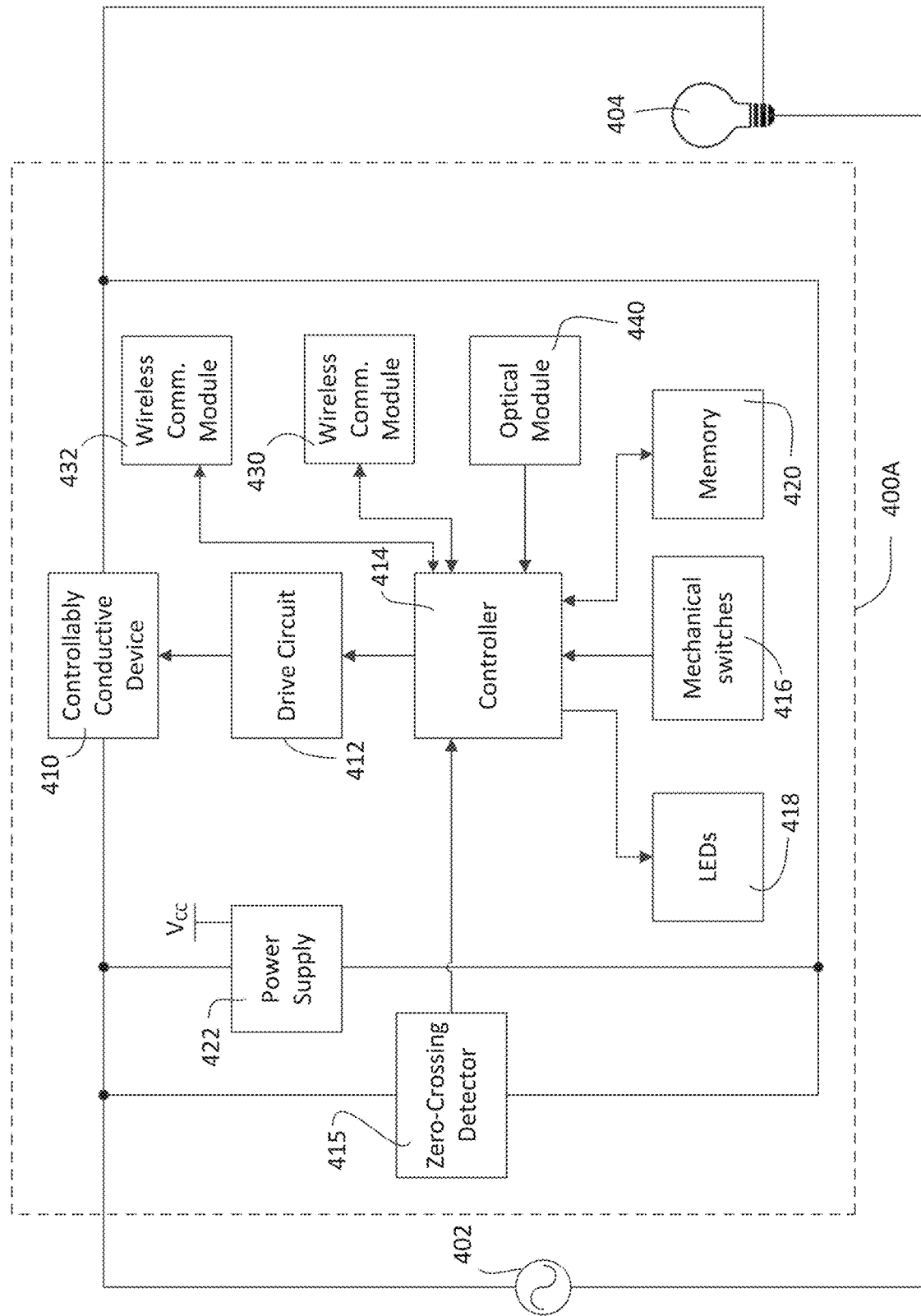
FIG. 4A is a first simplified example block diagram of the dimmer switch of the RF lighting control system of FIG. 2.

FIG. 4A is a simplified block diagram of a first example of a dimmer switch 400A (e.g., one of the dimmer switches 110A, 110B, 110C shown in FIG. 3A). The example dimmer switch 400A comprises a controllably conductive device 410 coupled in series electrical connection between the AC power source 102 and the lighting load 404 for control of the power delivered to the lighting load. The controllably conductive device 410 may comprise a relay or other switching device, or any suitable type of bidirectional semiconductor switch, such as, for example, a triac, a field-effect transistor (FET) in a rectifier bridge, or two FETs in anti-series connection. The controllably conductive device 410 includes a control input coupled to a drive circuit 412.

The dimmer switch 400A further comprises a control circuit, e.g., a controller 414, coupled to the drive circuit 412 for rendering the controllably conductive device 410 conductive or non-conductive to thus control the power delivered to the lighting load 404. The controller 414 may comprise a microcontroller, a programmable logic device (PLD), a microprocessor, an application specific integrated circuit (ASIC), a field-programmable gate array (FPGA), or any suitable processing device or control circuit. A zero-crossing detector 415 determines the zero-crossings of the input AC waveform from the AC power supply 402. A zero-crossing may be the time at which the AC supply voltage transitions from positive to negative polarity, or from negative to positive polarity, at the beginning of each half-cycle. The controller 414 receives the zero-crossing information from the zero-crossing detector 415 and provides the control inputs to the drive circuit 412 to render the controllably conductive device 410 conductive and non-conductive at predetermined times relative to the zero-crossing points of the AC waveform.

The controller 414 receives inputs from mechanical switches 416 that are mounted on a printed circuit board (not shown) of the dimmer switch 400A, and are arranged to be actuated by buttons (e.g., the toggle actuator 114 and the intensity adjustment actuator 116). The controller 414 also controls light-emitting diodes 418, which are also mounted on the printed circuit board. The light emitting diodes 418 may be arranged to illuminate visual indicators (e.g., the visual indicators 118) on a front surface of the dimmer switch 400A, for example, through a light pipe structure (not shown). The controller 414 is also coupled to a memory 420 for storage of unique identifiers (e.g., the MAC address and the IP address) of the dimmer switch 400A, the SSID and the SSID password of the wireless LAN, instructions for controlling the lighting load 404, programming instructions for communicating via a wireless communication link, or the like. The memory 420 may be implemented as an external integrated circuit (IC) or as an internal circuit of the controller 414. A power supply 422 generates a direct-current (DC) voltage Vcc for powering the controller 414, the memory 420, and other low-voltage circuitry of the dimmer switch 400A.

The dimmer switch 400A further includes a wireless communication module (e.g. circuit) 430 for transmitting and receiving wireless signals (e.g., the RF signals 106 and/or 108) to and from a wireless device (e.g., the wireless control device 120, the gateway device 310, and/or the wireless router 130). For example, the wireless communication module 430 may be configured to communicate via a Wi-Fi communication link, a Wi-MAX communication link, a Clear Connect™ communication link, and/or a Bluetooth® communication link. The wireless communication module 430 may also include one or more other radio protocol modules (e.g. radios) that may be operable to communicate via a number of other protocols including Wi-Fi and/or a proprietary RF protocol such as the Clear Connect™ protocol. The dimmer switch 400A may further include a second wireless communication module (e.g. circuit) 432 that may be configured to communicate via a Wi-Fi communication link, a Wi-MAX communication link, a Clear Connect™ communication link, and/or a Bluetooth® communication link. The wireless communication module 432 may also include one or more other radio protocol modules (e.g. radios) that may be operable to communicate via a number of other protocols including Wi-Fi and/or a proprietary RF protocol such as the Clear Connect™ protocol.

When the wireless communication modules 430 and/or 432 comprise a Wi-Fi module, the controller 414 is operable to control the lighting load 104 in response to received digital messages in Wi-Fi packets (i.e., Internet Protocol packets received via the Wi-Fi signals). If both of the wireless communication modules 430 and 432 comprise Wi-Fi modules, the modules may communication using different frequency channels. The wireless communication module 430 and/or 432 may comprise one or more RF transceivers and one or more antennas. Examples of antennas for wall-mounted dimmer switches are described in greater detail in U.S. Pat. No. 5,736,965, issued Apr. 7, 1998, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The dimmer switch 400A further comprises an optical module (e.g. circuit) 440, such as an optical signal receiving circuit for example. The optical module 440 may be optically coupled to an optical receiver (e.g., the optical receiver 119). The optical module 440 may be coupled to the optical receiver 119 on the front surface of the dimmer switch 400A, for example, through a light pipe (not shown), such that the optical module 440 may receive the optical signals from the wireless control device 120 via the light pipe. For example, the optical module 440 may comprise a photodiode (not shown) that is responsive to the optical signals transmitted by the wireless control device 120. In addition, the photodiode of the optical module 440 may be controlled by the controller 414, so as to transmit optical signals to the wireless control device 120 (as will be described in greater detail below), for example.

The wireless control device 120 may control the controllably conductive device 410 using the optical signals and/or the digital messages received via the RF signals 106 and/or RF signals 108. For example, the controller 414 may determine the module from which the signals are received, e.g., from the wireless communication module 430 and/or 432 or the optical module 440, and the controllably conductive device 410 may be controlled based on those signals. The controller 414 may also transmit messages to the wireless control device 120 via optical signals or digital messages transmitted via the RF signals 106 and/or RF signals 108. For example, the controller 414 of the dimmer switch 400A may be used to transmit digital messages to the wireless control device 120 via wireless communication. The digital messages may include alerts and/or feedback and status information regarding the lighting load 104. The digital messages may also include error messages or indications as to whether the dimmer switch 400A is able to communicate via a wireless communication link or RF signals 106 and/or RF signals 108, for example.

Figure 4B:
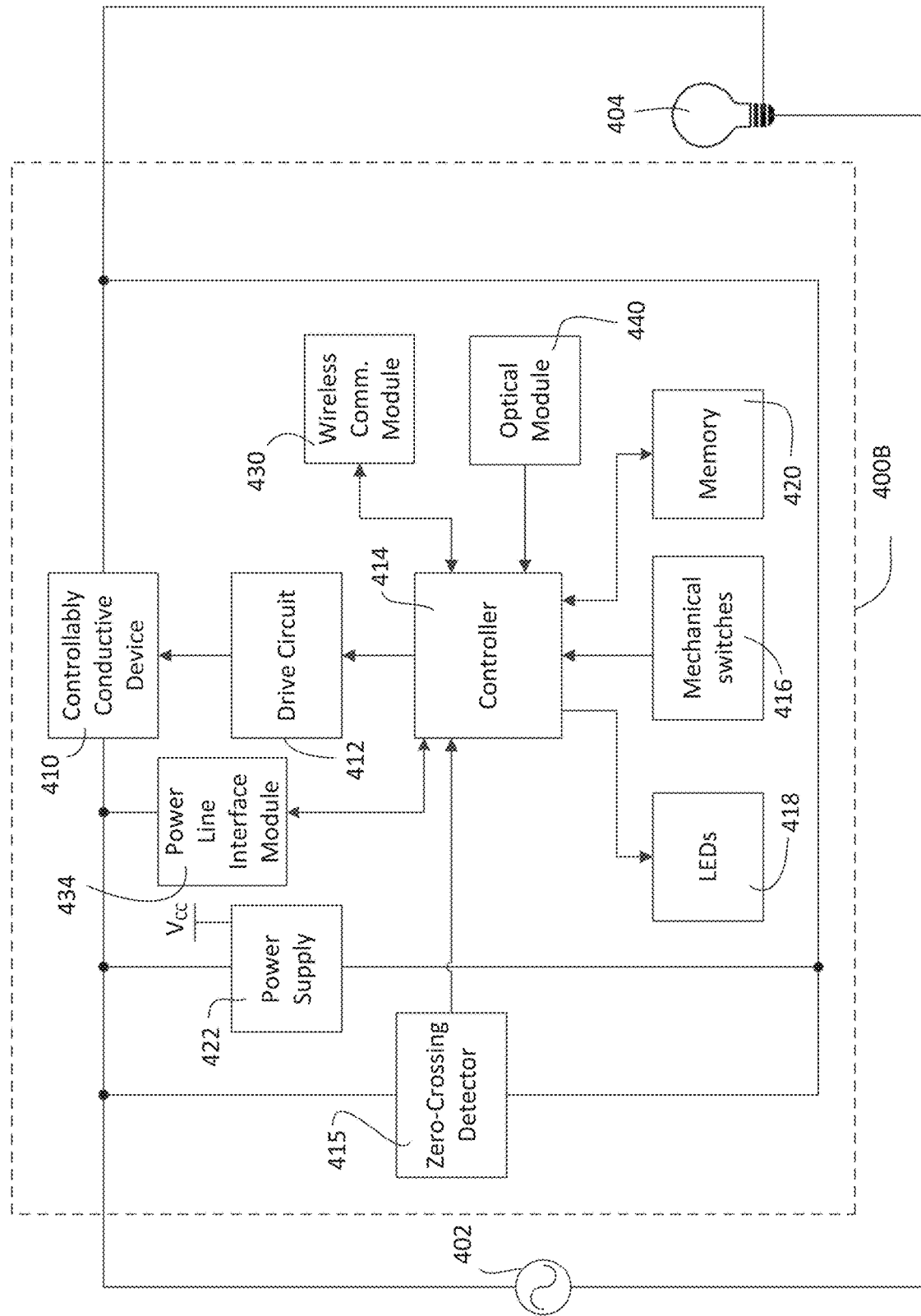
FIG. 4B is a second simplified example block diagram of the dimmer switch of the RF lighting control system of FIG. 2.

FIG. 4B is a simplified block diagram of a second example of a dimmer switch 400B (e.g., one of the dimmer switches 110A, 110B, 110C shown in FIG. 3B). The example dimmer switch 400B comprises a controllably conductive device 410, a drive circuit 412, a controller 414, a zero-crossing detector 415, mechanical switches 416, light-emitting diodes 418, a memory 420, a power supply 422, and an optical module 440. The elements within these devices, the functions of these devices, and/or interactions of and among these devices may be the same or similar as described with respect to FIG. 4A.

The dimmer switch 400B further includes a wireless communication module (e.g. circuit) 430 for transmitting and receiving RF signals (e.g., the RF signals 106) to and from a wireless device (e.g., the wireless control device 120, the gateway device 310, and/or the wireless router 130). For example, the wireless communication module 430 may be configured to communicate via a Wi-Fi communication link, a Wi-MAX communication link, a Clear Connect™ communication link, and/or a Bluetooth® communication link. The wireless communication module 430 may also include one or more other radio protocol modules (e.g. radios) that may be operable to communicate via a number of other protocols including Wi-Fi and/or a proprietary RF protocol such as the Clear Connect™ protocol.

The dimmer switch 400B may further include a power line interface (e.g. circuit) module 434 for transmitting and receiving signals carried on the conductors connected to the AC power source 102 via an Ethernet IP based protocol (e.g. TCP/IP, and/or a power line communication protocol such as the "HomePlug" protocol) where the conductors may deliver electrical energy from the AC power source 402 to the dimmer switch 400B. The power line interface module 434 may also transmit, receive, and/or interpret energy pulses that may be used to convey signals and/or information via the conductors may deliver electrical energy from the AC power source 402 to the dimmer switch 400B.

When the wireless communication module 430 comprises a Wi-Fi module, the controller 414 is operable to control the lighting load 404 in response to received digital messages in Wi-Fi packets (i.e., Internet Protocol packets received via the Wi-Fi signals). The wireless communication module 430 may comprise one or more RF transceivers and one or more antennas.

The wireless control device 120 may control the controllably conductive device 410 using the optical signals, the digital messages received via the RF signals 106, and/or digital messages received via the Ethernet IP based power line protocol (e.g., TCP/IP and/or "HomePlug" protocols). For example, the controller 414 may determine the module from which the signals are received, e.g., from the wireless communication module 430, the power line interface module 434, or the optical module 440, and the controllably conductive device 410 may be controlled based on those signals. The controller 414 may also transmit messages to the wireless control device 120 via optical signals or digital messages transmitted via the RF signals 106, and/or digital messages transmitted via the Ethernet IP based power line protocol. For example, the controller 414 of the dimmer switch 400B may be used to transmit digital messages to the wireless control device 120 via wireless communication. The digital messages may include alerts and/or feedback and status information regarding the lighting load 404. The digital messages may also include error messages or indications as to whether the dimmer switch 400B is able to communicate via a wireless communication link or RF signals 106, for example.

Figure 4C:
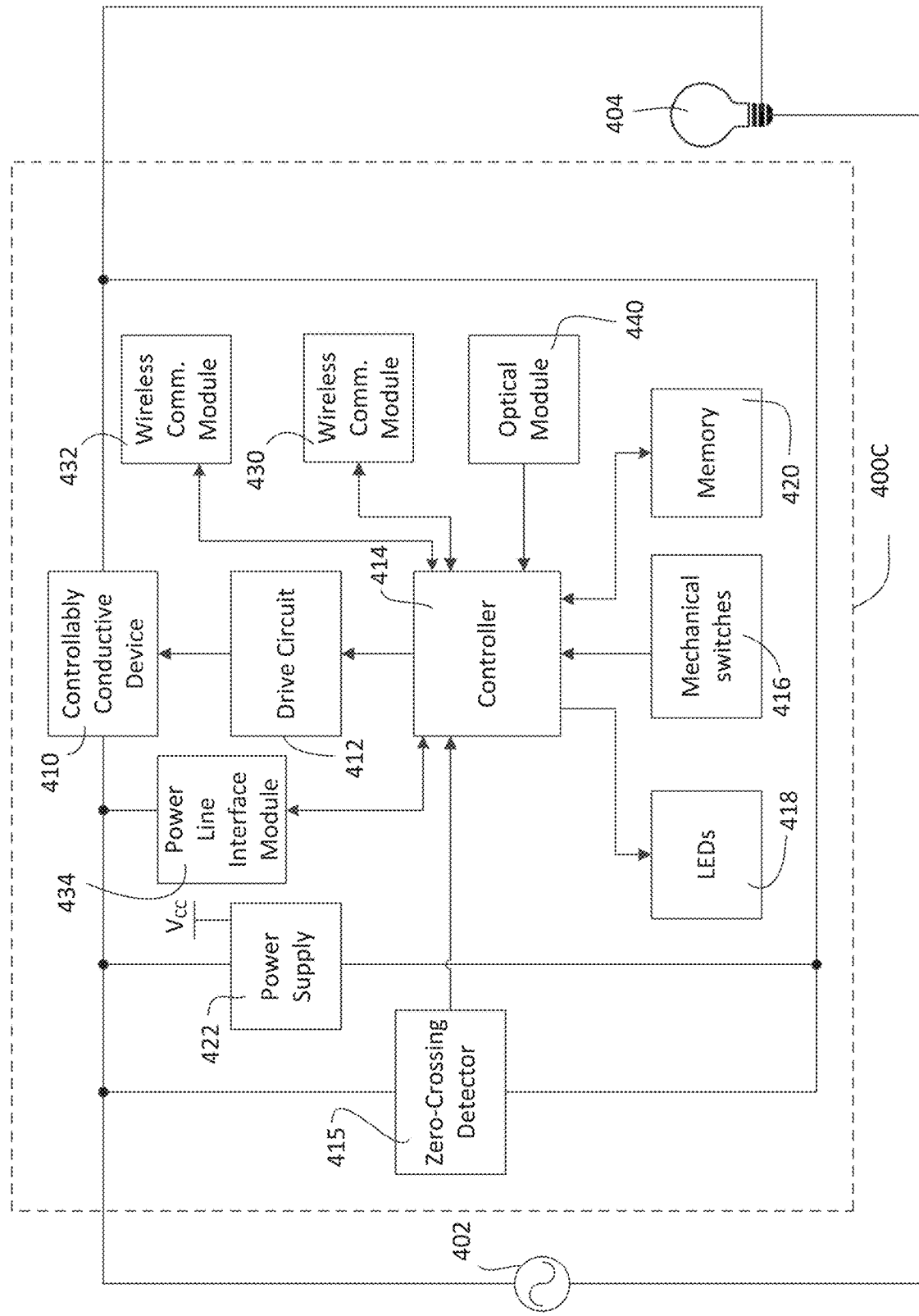
FIG. 4C is a third simplified example block diagram of the dimmer switch of the RF lighting control system of FIG. 2.

FIG. 4C is a simplified block diagram of a third example of a dimmer switch 400C (e.g., one of the dimmer switches 110A, 110B, 110C shown in FIG. 3C). The example dimmer switch 400C comprises a controllably conductive device 410, a drive circuit 412, a controller 414, a zero-crossing detector 415, mechanical switches 416, light-emitting diodes 418, a memory 420, a power supply 422, and an optical module 440. The elements within these devices, the functions of these devices, and/or interactions of and among these devices may be the same or similar as described with respect to FIG. 4A.

The dimmer switch 400C further includes a wireless communication module (e.g. circuit) 430 for transmitting and receiving RF signals (e.g., the RF signals 106 and/or 108) to and from a wireless device (e.g., the wireless control device 120, the gateway device 310, and/or the wireless router 130). For example, the wireless communication module 430 may be configured to communicate via a Wi-Fi communication link, a Wi-MAX communication link, a Clear Connect™ communication link, and/or a Bluetooth® communication link. The wireless communication module 430 may also include one or more other radio protocol modules (e.g. radios) that may be operable to communicate via a number of other protocols including Wi-Fi and/or a proprietary RF protocol such as the Clear Connect™ protocol. The dimmer switch 400C may further include a second wireless communication module (e.g. circuit) 432 that may be configured to communicate via a Wi-Fi communication link, a Wi-MAX communication link, a Clear Connect™ communication link, and/or a Bluetooth® communication link. The wireless communication module 432 may also include one or more other radio protocol modules (e.g. radios) that may be operable to communicate via a number of other protocols including Wi-Fi and/or a proprietary RF protocol such as the Clear Connect™ protocol. The dimmer switch 400C may further include a power line interface module (e.g. circuit) 434 for transmitting and receiving signals carried on the conductors connected to the AC power source 402 via an Ethernet IP based protocol (e.g. TCP/IP, and/or a power line communication protocol such as the "HomePlug" protocol) where the conductors may deliver electrical energy from the AC power source 402 to the dimmer switch 400C. The power line interface module 434 may also transmit, receive, and/or interpret energy pulses that may be used to convey signals and/or information via the conductors may deliver electrical energy from the AC power source 402 to the dimmer switch 400C.

When the wireless communication modules 430 and/or 432 comprise a Wi-Fi module, the controller 414 is operable to control the lighting load 404 in response to received digital messages in Wi-Fi packets (i.e., Internet Protocol packets received via the Wi-Fi signals). The wireless communication module 430 and/or 432 may comprise one or more RF transceivers and one or more antennas.

The wireless control device 120 may control the controllably conductive device 410 using the optical signals and/or the digital messages received via the RF signals 106 and/or RF signals 108. For example, the controller 414 may determine the module from which the signals are received, e.g., from the wireless communication module 430 and/or 432 or the optical module 440, and the controllably conductive device 410 may be controlled based on those signals. The controller 414 may also transmit messages to the wireless control device 120 via optical signals or digital messages transmitted via the RF signals 106 and/or RF signals 108. For example, the controller 414 of the dimmer switch 400C may be used to transmit digital messages to the wireless control device 120 via wireless communication. The digital messages may include alerts and/or feedback and status information regarding the lighting load 404. The digital messages may also include error messages or indications as to whether the dimmer switch 400C is able to communicate via a wireless communication link or RF signals 106 and/or RF signals 108, for example.

Figure 5A:
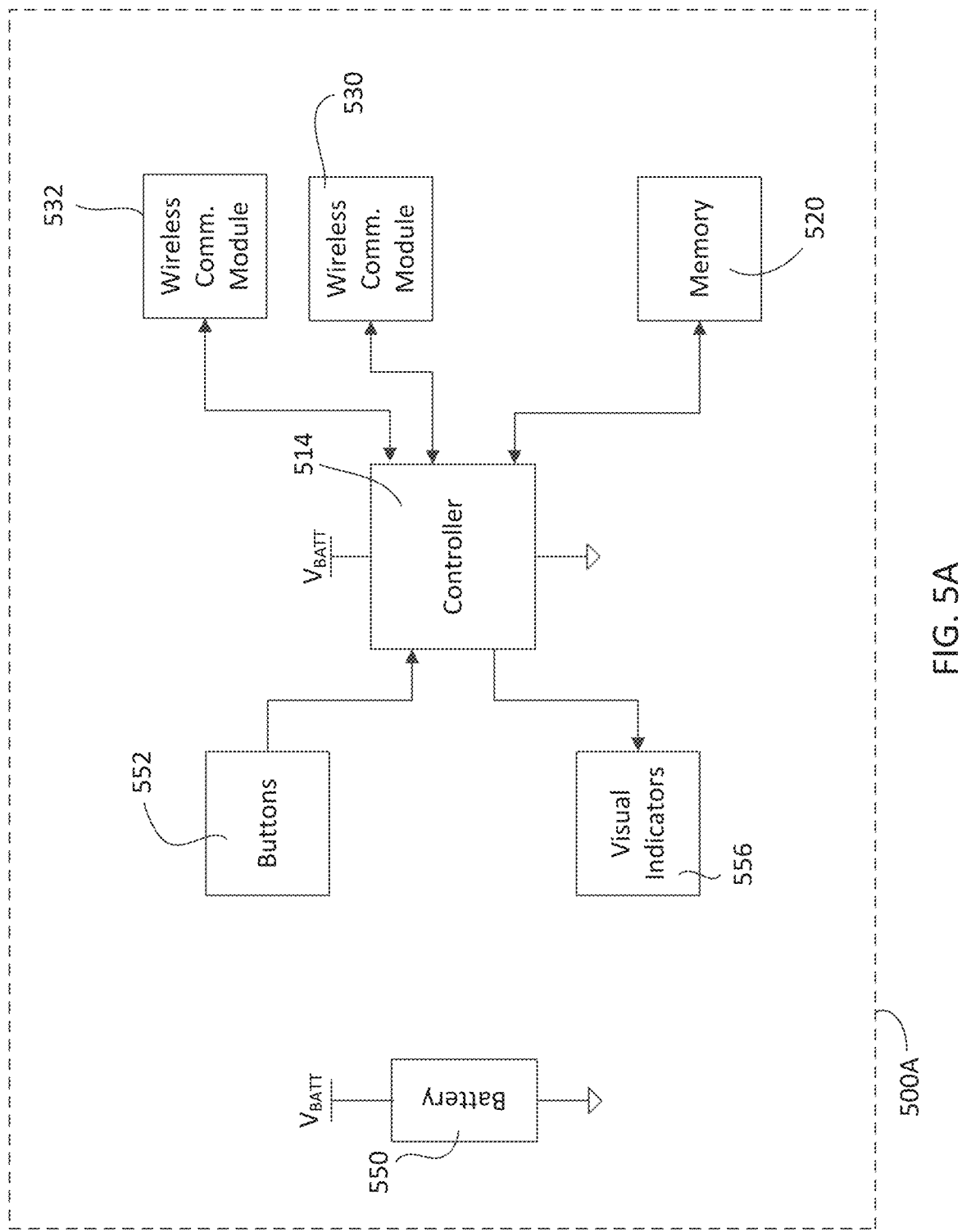
FIG. 5A is a first simplified example block diagram of an input device like the remote control devices of FIGS. 3A-3C.

FIG. 5A a first simplified example block diagram of an input device, e.g., a remote control device 500A (such as, the remote control device 184 of FIGS. 3A-3C). The example remote control device 500A may include devices such as a controller 514, a memory 520, a wireless communication module 530, and/or a wireless communication module 532. One or more of the elements within these devices, one or more of the functions of these devices, and/or one or more of the interactions of and among these devices may be the same or similar as described with respect to FIG. 4A. The remote control device 500A may also include a battery power supply 550 that may provide electrical power to the one or more devices included in the remote control device 500A, such as the controller 514.

The example remote control device 500A may also include buttons 552, visual indicators 556, and/or a battery 550. The controller 514 of the remote control device 500A may be configured to receive commands input via the one or more buttons 552. The one or more buttons 552 may include one or more soft buttons or one or more hard buttons (e.g., physical buttons or manual operators). For example, the controller 514 may interpret inputs via the one or more buttons 552 as user commands intended for one or more devices (e.g., a dimmer switch). Again by way of example, a user may contact one button of the one or more buttons 552 of remote control device 500A to order the appropriate dimmer switch (e.g., the dimmer switch 110A) to adjust the intensity of a lighting load (e.g., the lighting load 104A) to 50%, among many other configurable adjustments. The controller 514 of the remote control device 500A may interpret the signal from the one button of the one or more buttons 552 as a command to order the dimmer switch 110A to perform the adjustment to 50%.

The controller 514 may communicate the command to the dimmer switch 110A via one or more wireless signals sent via wireless communication module 530 and/or 532 (e.g., in a manner that is the same or similar to the functions described with respect to communication modules 430 and/or 432 as described with regard to FIG. 4A). The controller 514 of the remote control device 500A may be configured to control one or more visual indicators 556 to provide the user with one or more feedback or status indications (e.g. at least for a period of time). For example, one indicator of the one or more indicators 556 may indicate (e.g. for some period of time) that one or more buttons 552 may have been activated by a user (e.g. as interpreted by the controller 514). Also by way of example, one indicator of the one or more indicators 556 may indicate (e.g., for a period of time) that the dimmer switch 110A has received the command from the controller 414 to perform an adjustment (e.g. as input by the user) of the lighting load 104A. Also by way of example, one indicator of the one or more indicators 556 may indicate that that battery 550 is at a low level of charge.

Figure 5B:
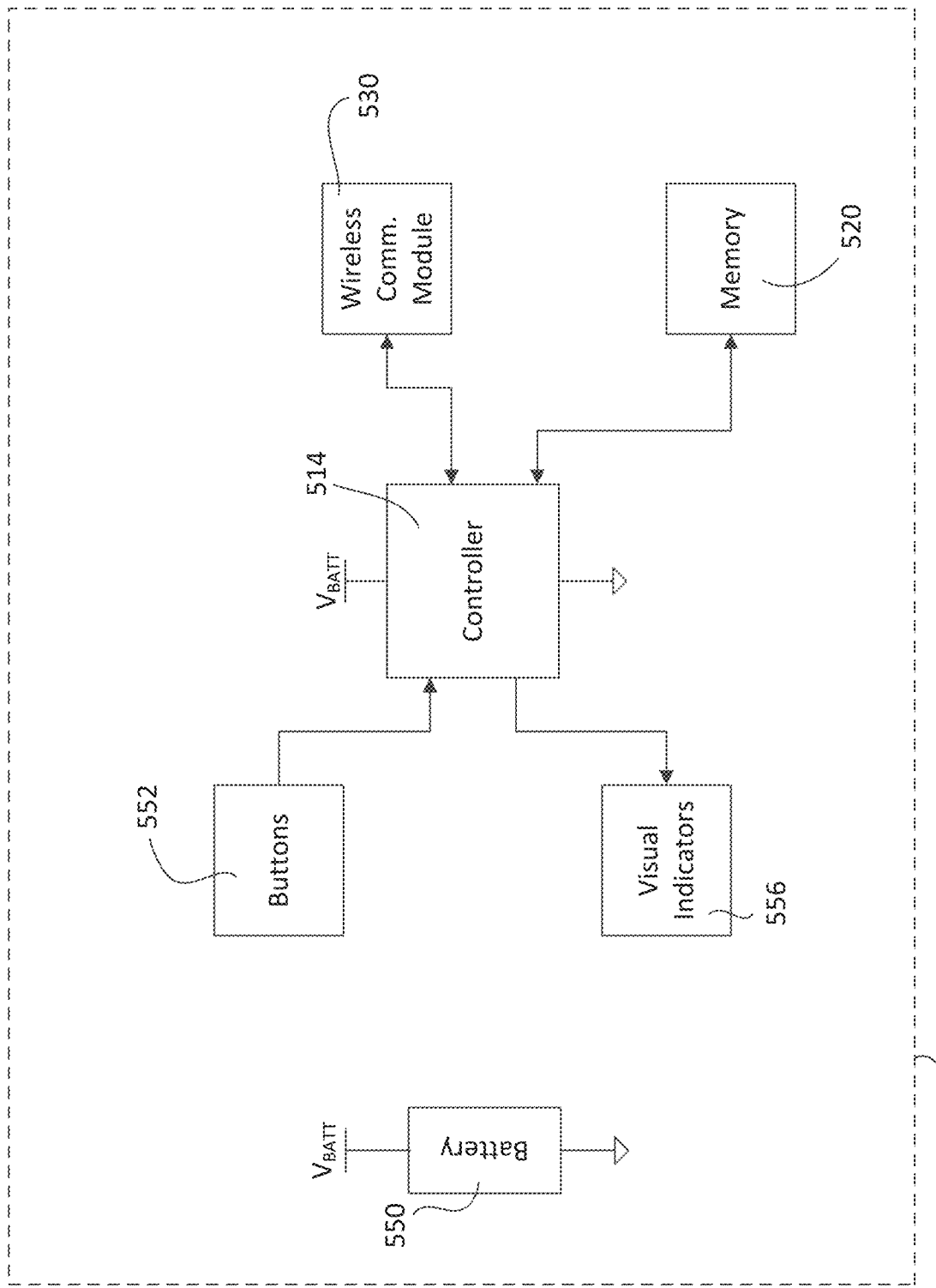
FIG. 5B is a second simplified example block diagram of an input device like the remote control device of FIGS. 3A-3C.

FIG. 5B a second simplified example block diagram of an input device, e.g., a remote control device 550B (such as the remote control device 184 of FIGS. 3A-3C). The remote control device 500B may include one or more of the same or similar functional blocks as those included and described with respect to the remote control device 500A of FIG. 5A. The one or more of the elements within these functional blocks, one or more of the functions of these functional blocks, and/or one or more of the interactions of and among these functional blocks may be the same or similar as described with respect to FIG. 4A and FIG. 5A. The remote control device 500B may operate with just the wireless communication module 530 in lieu of both the wireless communication modules 530 and 532.

Figure 5C:
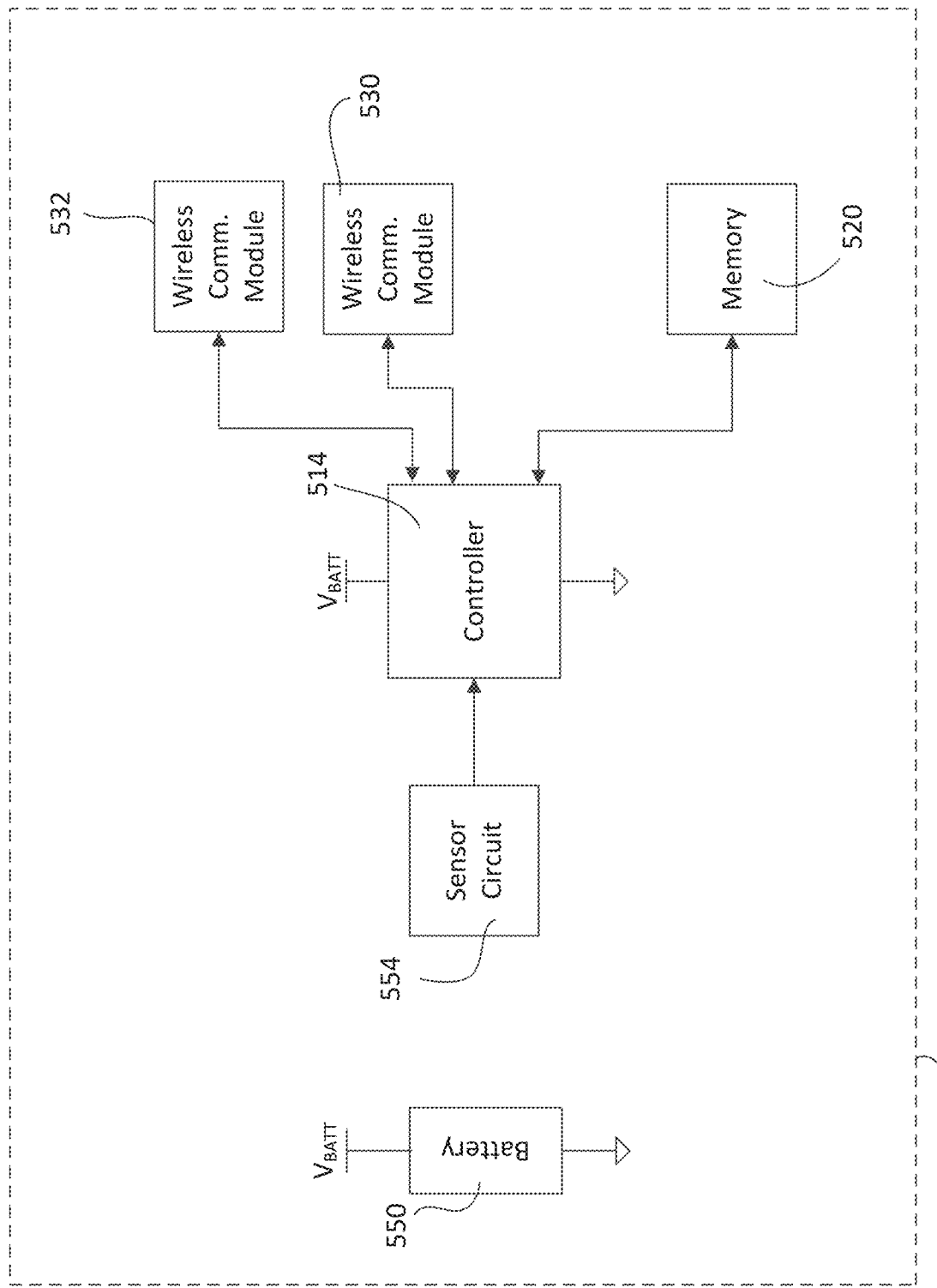
FIG. 5C is a first simplified example block diagram of a sensor device like the occupancy sensor of FIGS. 3A-3C.

FIG. 5C is a first simplified example block diagram of a sensor device, e.g., an occupancy sensor 500C (such as the occupancy sensor 180 of FIGS. 3A-3C). The occupancy sensor 500C may include one or more of the same or similar functional blocks as those included and described with respect to the remote control device 500A of FIG. 5A. The one or more of the elements within these functional blocks, one or more of the functions of these functional blocks, and/or one or more of the interactions of and among these functional blocks may be the same or similar as described with respect to FIG. 4A and FIG. 5A.

The occupancy sensor 500C may also include at least one sensor circuit 554. The at least one sensor circuit 554 may detect the presence (or lack thereof) of people in a given area of senor effectiveness. The controller 514 of the occupancy sensor 500C may be configured to receive a signal from the at least one sensor 554, interpret the signal as indicating a presence or absence of people in the given area of sensor effectiveness (perhaps for a period of time), and/or send one or more commands to other devices based on the interpreted presence of people or lack thereof. For example, should the controller 514 of the occupancy sensor 500C interpret the at least one sensor 554 to report the lack of presence in the given area of effectiveness (perhaps for some period of time, e.g., 60 seconds), the controller may send respective commands to wireless devices, e.g., to one or more of the dimmer switches 110A, 110B, and/or 110C to lower the respective intensities of the lighting loads 104A, 104B, and/or 104C (e.g., shutoff all the lights when all people have left the room). Also by way of example, should the controller 514 of the occupancy sensor 500C interpret the at least one sensor 554 to report a transition from a lack of any presence to the presence of at least one person in the given area of effectiveness, the controller may send respective commands to one or more of the dimmer switches 110A, 110B, and/or 110C to increase the respective intensities of the lighting loads 104A, 104B, and/or 104C (e.g., turn at least some of the lights when at least one person enters the area of sensor effectiveness). The controller 514 of the occupancy sensor 500C may communicate the command to the dimmer switch 110A, dimmer switch 110B, and/or dimmer switch 110C via one or more wireless signals sent via wireless communication module 530 and/or 532 (e.g., in a manner that is the same or similar to the functions described with respect to communication modules 430 and/or 432 as described with regard to FIG. 4A).

Figure 5D:
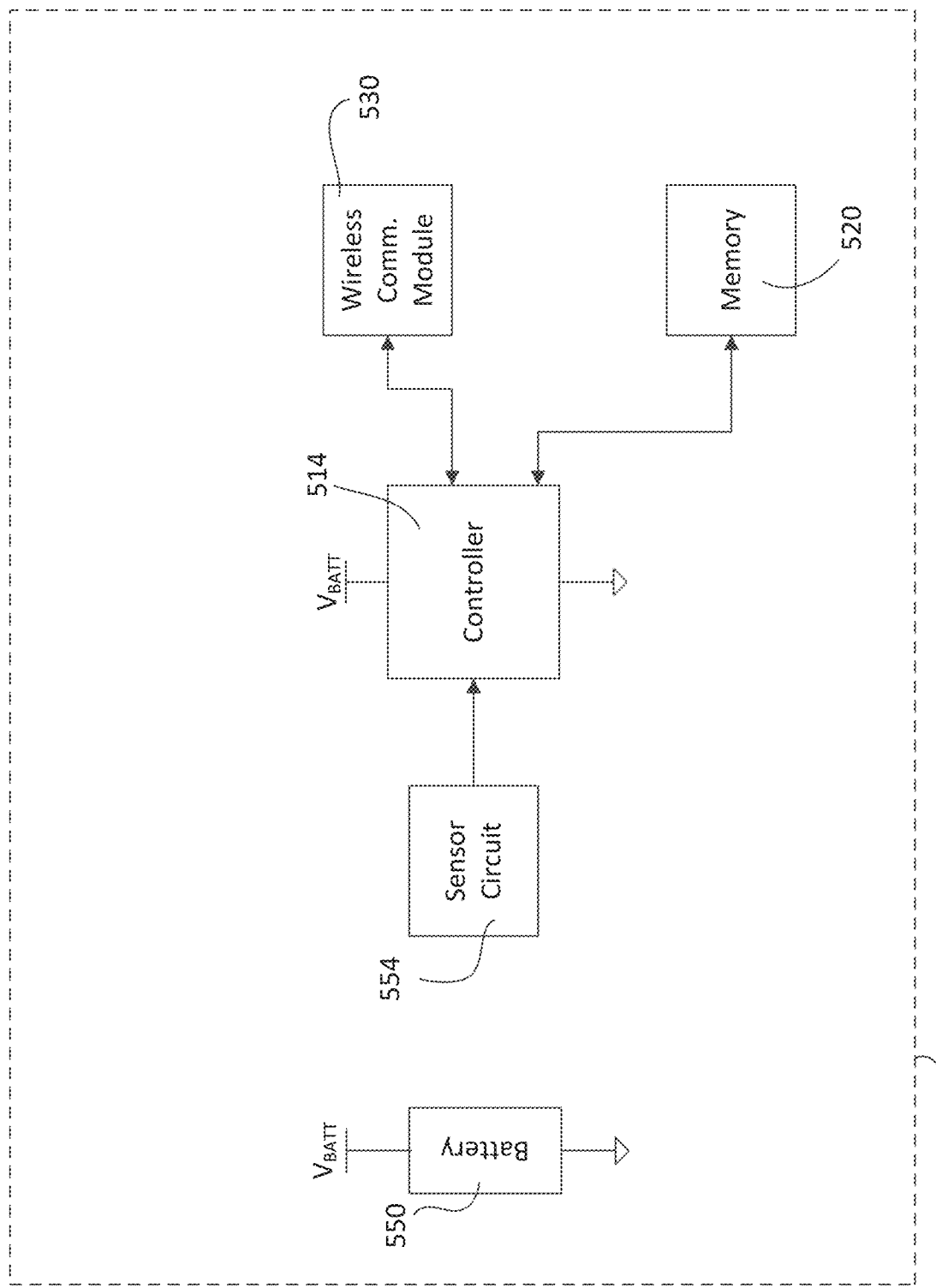
FIG. 5D is a second simplified example block diagram of a sensor device like the occupancy sensor of FIGS. 3A-3C.

FIG. 5D a second simplified example block diagram of a sensor device (such as the occupancy sensor 180 of FIGS. 3A-3C). The occupancy sensor 500D may include one or more of the same or similar functional blocks as those included and described with respect to the occupancy sensor 500C of FIG. 5C. The one or more of the elements within these functional blocks, one or more of the functions of these functional blocks, and/or one or more of the interactions of and among these functional blocks may be the same or similar as described with respect to FIG. 4A, FIG. 5A, and FIG. 5A. The occupancy sensor 500D may operate with just the wireless communication module 530 in lieu of both the wireless communication modules 530 and 532.

Figure 5E:
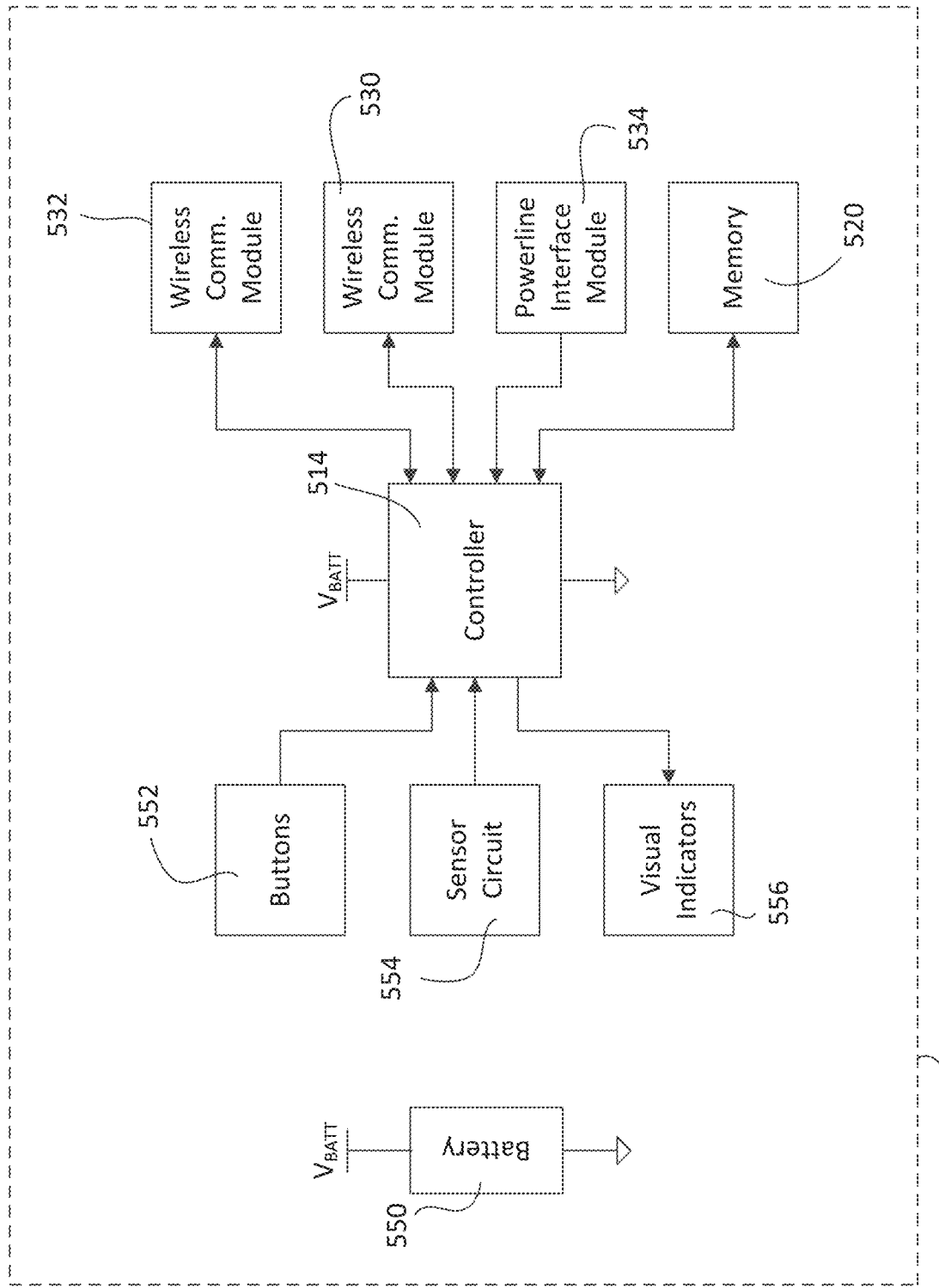
FIG. 5E is a simplified example block diagram of a contemplated combination input and sensor device which may be employed in the environments of FIGS. 3A-3C.

FIG. 5E is a simplified example block diagram of a contemplated combination input and sensor device 500E which may be employed in the environments of FIGS. 3A-3C. The combination input/senor device 500E may include one or more of the same or similar functional blocks as those included and described with respect to the remote control device 500A and 500B and the occupancy sensor 500C and 500D that may be employed in the environments of FIGS. 3A-3C. The one or more of the elements within these functional blocks, one or more of the functions of these functional blocks, and/or one or more of the interactions of and among these functional blocks may be the same or similar as described with respect to FIG. 4A, FIG. 5A, and FIG. 5C.

As described previously, any of the devices of the network environments 300A-300C of FIGS. 3A-3C (e.g. wireless control device 120, dimmer switches 110A, 110B, and/or 110C, router 130, occupancy sensor 180, remote control 184, laptops 312 and/or 314, among others shown and not shown) for a number of contemplate purposes, may include one or more radios. For example, any of the devices of the network environments 300A-300C may include at least one radio that may be operable to transmit via multiple protocols (e.g., the Wi-Fi and/or the Clear Connect™ protocols) over multiple communication networks, wired and/or wireless, which may be operable to communicate with the respective protocols. Alternatively or additionally, any of the devices of the network environments 300A-300C may include at least one radio that may be operable to transmit/receive via at least one protocol (e.g., the Wi-Fi protocol) and at least a second radio that may be operable to transmit/receive via at least another protocol (e.g., a proprietary RF protocol like the Clear Connect™ protocol) over multiple communication networks, wired and/or wireless, that may be operable to communicate with the respective protocols.

One or more, or any, of the devices of the network environments 300A-300C may serve as a master gateway node (e.g., may be elected by the other devices to serve as the master gateway node). The master gateway node may serve as a Dynamic Host Configuration Protocol (DHCP) node (or function), for example. The master gateway node may provide one or more, or any, of the other devices of the network environments 300A-300C with information that may enable the one or more other devices to connect to the Wi-Fi network (e.g., an IP based protocol). By way of example, and not limitation, the master gateway node may provide the one or more devices of the network environments 300A-300C with a service set identifier (SSID), an SSID password, a wireless security password or key value such as a WEP password/key or a WPA password/key, and/or an IP address, and/or other credentials or access information to enable the respective devices to connect (or register) to the Wi-Fi protocol network (e.g., via the router 130). Such Wi-Fi access information may be preconfigured on any of the respective devices of the network environments 300A-300C.

The Wi-Fi access information may be provided to the one or more devices of the network environments 300A-300C via a reliable broadcast-capable RF protocol, such as the previously described Clear Connect™ protocol, either approximately at a time that it may be useful for the one or more devices to join the Wi-Fi communication network, or at some time earlier. For example, the Wi-Fi access information (e.g., even if preconfigured) for the one or more devices may be updated by the master gateway node either periodically or under certain conditions. Also, the master gateway node may provide an indication (e.g., via the Clear Connect™ protocol) to the one or more devices of the network environments 300A-300C that may invite the one or more devices to use the Wi-Fi protocol access information to communicate, at least temporarily (e.g., for a firmware upgrade), with one or more devices of the network environments 300A-300C (e.g., the master gateway node or any other device of the network environments 300A-300C). For example, perhaps after the invited node may have completed the function for which it was invited to join the Wi-Fi network (e.g., a firmware upgrade is fully communicated and/or completed), the master gateway node may signal (e.g., via the Wi-Fi and/or Clear Connect™ protocols) the invited node to discontinue Wi-Fi communication and/or to leave the Wi-Fi network. By requesting that the invited node discontinue Wi-Fi communication and/or to leave the Wi-Fi network, the burden on the router 130 and/or Wi-Fi communication may be minimized. Alternatively or additionally, the invited node may be configured to discontinue Wi-Fi communication and/or to leave the Wi-Fi network after the completion of the function for which it was invited to communicate via Wi-Fi and/or after the end of a timeout period (e.g., the invited node may leave the Wi-Fi network on its own determination and without being requested to leave the Wi-Fi network).

Alternatively or additionally, the one or more devices of the network environments 300A-300C may use the Wi-Fi access information to communicate with one or more other devices of the network environments 300A-300C at a time and/or under a condition determined by the one or more devices of the network environments 300A-300C that may be in possession of Wi-Fi access information. For example, dimmer switch 110A may use its respective Wi-Fi access information to join the Wi-Fi communication network to communicate data or information (e.g., to communication monitoring database information to one or other devices of the network environments 300A-300C) via the Wi-Fi protocol, (e.g., perhaps because its monitoring database may have become full). After the dimmer switch 110A communicates the data or information, the dimmer switch 110A may discontinue communication via the Wi-Fi protocol until such time as the dimmer switch 110A may be invited to (or may decide itself to) communicate once again via the Wi-Fi protocol. In addition, when a button of an input device (e.g., the remote control device 184) is actuated, the input device may use its respective Wi-Fi access information to join the Wi-Fi communication network to communicate information regarding an actuation of the button. Further, a sensor device (e.g., the occupancy sensor 180) may use its respective Wi-Fi access information to join the Wi-Fi communication network to communicate information regarding an occupancy or vacancy condition. Alternatively, a sensor device, such as a daylight sensor, may periodically use its respective Wi-Fi access information to join the Wi-Fi communication network to communicate information regarding an ambient light intensity measured in a space.

The Wi-Fi protocol may be useful via which to communicate high bandwidth data (e.g. configuration data such as firmware upgrades and/or data for relatively sophisticated user interfaces, programming data, and/or database data management) among Wi-Fi capable (IP capable) devices. A reliable broadcast-capable RF protocol, such as the previously described Clear Connect™ protocol may be useful via which to communicate relatively low bandwidth data and/or relatively high performance signaling information (e.g. operational data such as operational commands, operational (runtime) error codes, programming error codes, and/or timing synchronization signals, among other relatively high performance data). It may be useful to allocate high bandwidth data signaling (e.g. firmware upgrades, user interface data, and/or database information transfer) more to Wi-Fi protocol communication so that reliable broadcast-capable RF protocol communication, such as via the Clear Connect™ protocol, may be allocated for the relatively high performance data signaling (e.g. time synchronization signaling).

For example, radios using the Wi-Fi protocol may communicate at a frequency of 2.4 GHz. This frequency may be considered part of the industrial, scientific, and medical (ISM) radio band—which may fairly crowded, may be widely available, and may be generally considered to be an unlicensed band. Radios may communicate using the Wi-Fi protocol at a range of 120 to 300 feet (with 802.11n, up to double these ranges may be possible), for example. Radios may communicate using the Wi-Fi protocol at a rate of up to 54 Mbits/s (802.11g) and/or 300 Mbit/s (802.11n), with an average data rate of approximately 22 Mbit/s, for example. Radios may communicate via Wi-Fi with an output power of approximately 20-100 mW (13-20 dBm).

For example, radios using the Clear Connect™ protocol may communicate at frequencies of 434 MHz and/or 868 MHz (perhaps based on regional factors). The 434 MHz and 868 MHz bands may be far less crowded than other bands and may be licensed, and may be subject to a relatively stringent set of regulations, including the United States' Federal Communications Commission (FCC) regulations that may limit transmit power and/or duty cycle, for example. Radios may communicate using the Clear Connect™ protocol at a range of 30 to 60 feet indoor and/or 300 feet open air (perhaps extendable via repeaters), for example. Radios may communicate using the Clear Connect™ protocol at a rate of up to 62.5 Kbit/s, for example. Radios may communicate via the Clear Connect™ protocol with an output power of approximately 4 mW (5 dBm).

Figure 6:
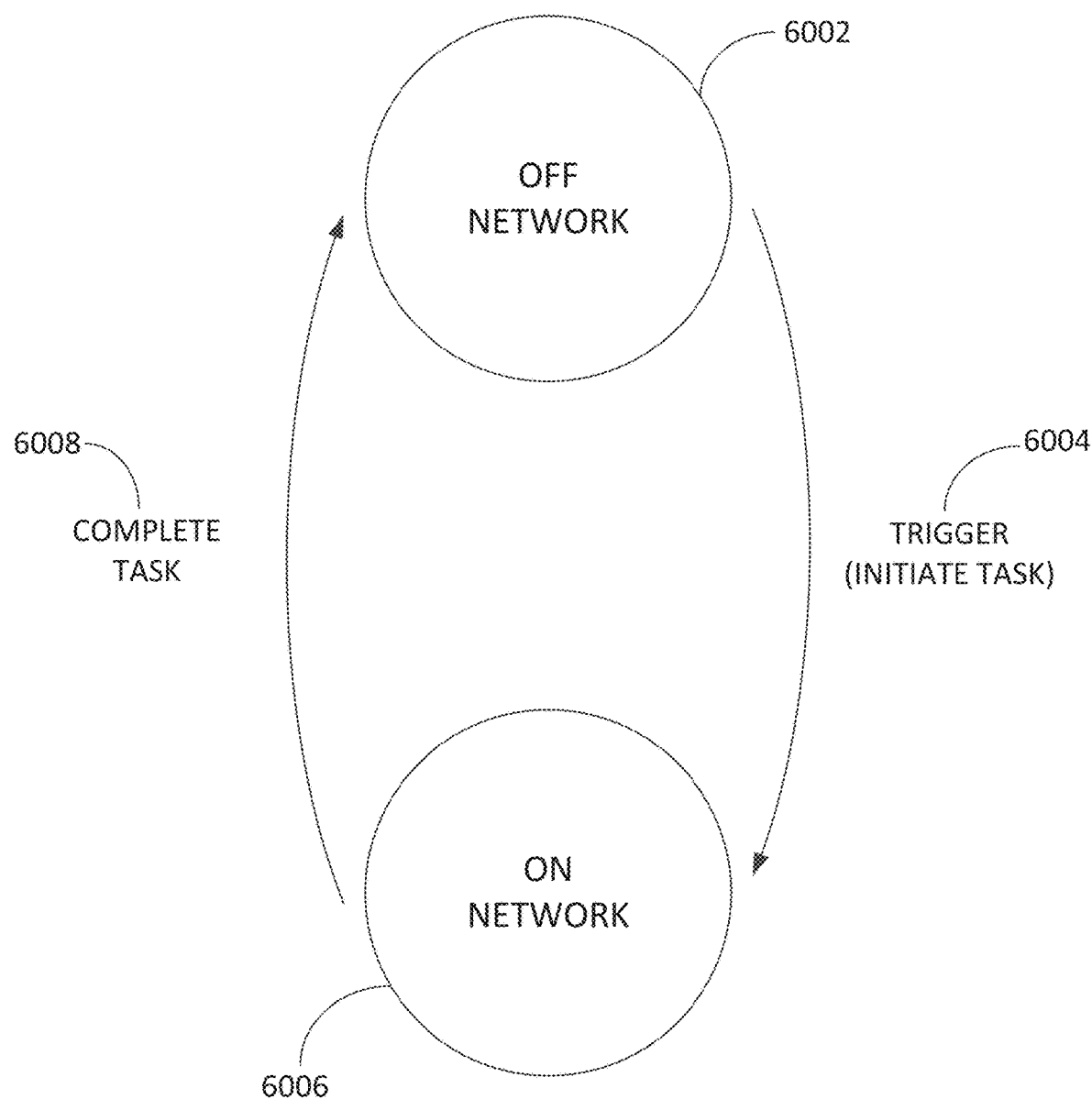
FIG. 6 is a diagram that illustrates network access activity for one or more contemplated devices and techniques.

FIG. 6 is a diagram that illustrates wireless communication network access activity for one or more contemplated devices and techniques. At 6002, one or more devices, such as the dimmer switch 110A, dimmer switch 110B, dimmer switch 110C, the occupancy sensor 180, and/or the remote control device 184, and other devices from environments 300A-300C (both shown and not shown), may not be communicating via a wireless communication network (e.g., a wireless local area network (LAN)) in which communication may be conducted via a particular wireless protocol, for example the Wi-Fi protocol. By not communicating on the Wi-Fi communication network, the respective device or devices may not place a burden on the Wi-Fi communication network and/or the router 130. While the respective device or devices may not be communicating on the Wi-Fi communication network, the device or devices may or may not be operating on another wireless communication network (e.g. a Clear Connect™ protocol network) and/or a wired communication network (e.g., a wired TCP/IP network or a power line protocol network). At 6004, one or more of the devices may, perhaps to execute a particular task, receive a trigger from another device to access the Wi-Fi communication network. Alternatively or additionally, the device may determine an internal trigger condition to access the Wi-Fi communication network.

At 6006, the device or devices may access the Wi-Fi communication network, perhaps with access information provided by another device or preconfigured on the accessing device or devices. While on the Wi-Fi communication network the device or devices may execute the tasks or tasks that may have been part of the trigger for the device or devices to access the Wi-Fi communication network. At 6008, perhaps either after completing the task, after some predetermined time, and/or after receiving a disconnect signal from another device, the device or devices may leave the Wi-Fi communication network.

Figure 7:
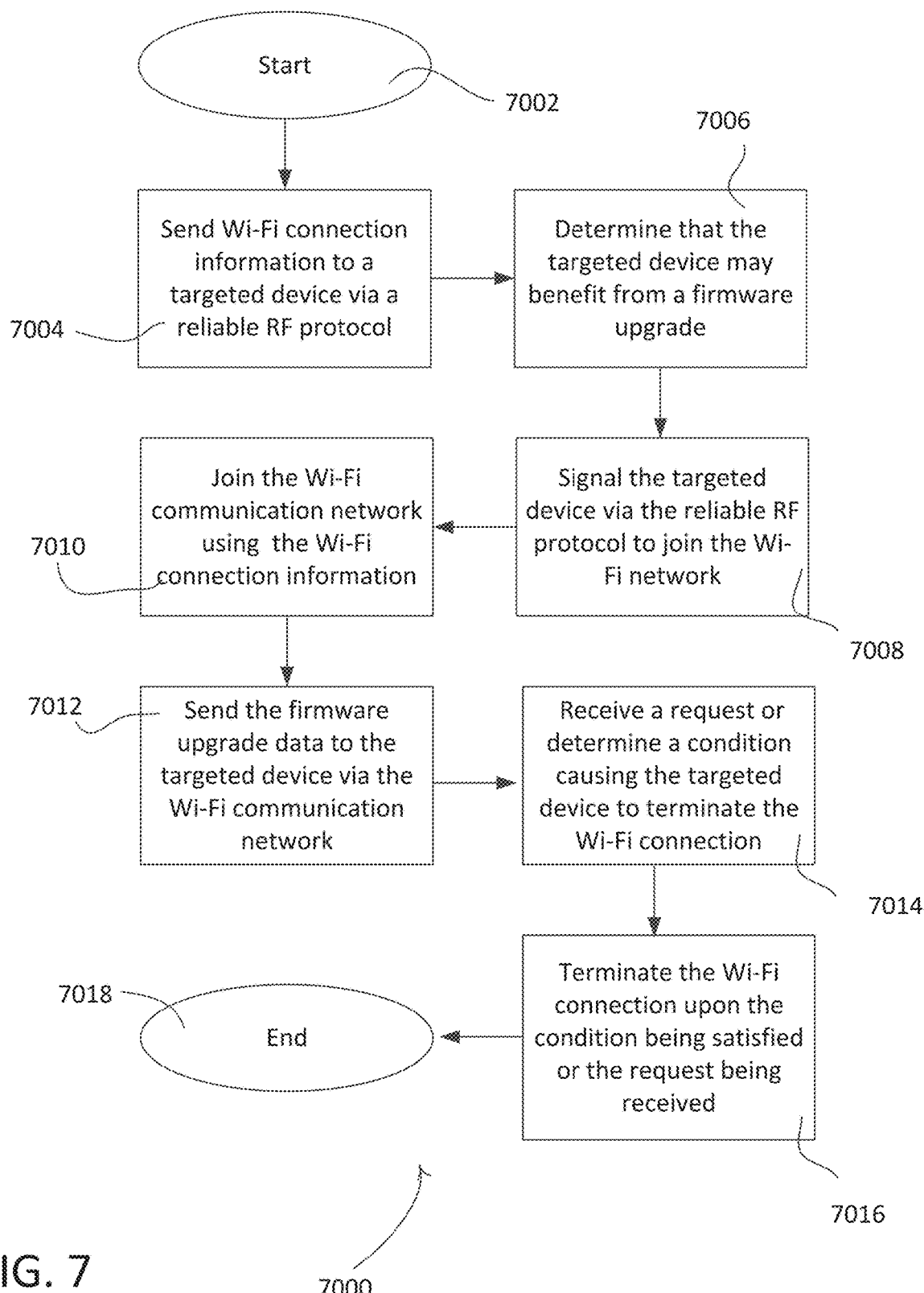
FIG. 7 is an exemplary flow chart for Internet Protocol address assignments for load control devices.

Referring to FIG. 7 and in view of FIGS. 3A-3C, a contemplated technique 7000 may start at 7002 and may include, at 7004, sending Wi-Fi connection information (e.g., from the master gateway node) to a targeted device of a network environment (e.g., dimmer switch 110A or other load control device) via a proprietary RF protocol (e.g., the Clear Connect™ protocol). At 7006, another node in the network environment may decide to communicate a firmware upgrade to the targeted device. At 7008, the targeted node may be signaled (e.g. via the master gateway node) to use the Wi-Fi connection information to establish a Wi-Fi communication connection (e.g., with the router 130) via a proprietary RF protocol (e.g., Clear Connect™ protocol).

At 7010, the targeted device may use the Wi-Fi connection information to establish itself on the Wi-Fi network and commence Wi-Fi communication (e.g., via the IP address provided by the master gateway node). At 7012, send the firmware upgrade data to the targeted device via the Wi-Fi communication network (e.g., the master gateway device and/or via the IP address of the targeted device). At 7014, upon the completion of the firmware upgrade data transfer and/or a successful firmware upgrade, the targeted device may receive a request (e.g., via the master gateway node) to terminate Wi-Fi communication and/or leave the Wi-Fi network. Alternatively or additionally, at 7014, upon the completion of the firmware upgrade data transfer and/or a successful firmware upgrade, the targeted device may determine a condition and/or period of time to terminate Wi-Fi communication and/or leave the Wi-Fi network. At 7016, the targeted device may terminate the Wi-Fi connection and/or leave the Wi-Fi network upon the condition being satisfied or the request being received. At 7018, the technique may end and may resume at 7002 as often as required to accommodate user configured load control functions for the network environments 300A-300C.

While the present application has been described with reference to the dimmer switches 110, and the wireless control devices 120, the concepts of the contemplated devices and techniques could be applied to any control devices that are operable to communicate with each other, such as, for example, dimming ballasts for driving gas-discharge lamps; light-emitting diode (LED) drivers for driving LED light sources; screw-in luminaires including integral dimmer circuits and incandescent or halogen lamps; screw-in luminaires including integral ballast circuits and compact fluorescent lamps; screw-in luminaires including integral LED drivers and LED light sources; electronic switches, controllable circuit breakers, or other switching devices for turning appliances on and off; plug-in load control devices, controllable electrical receptacles, or controllable power strips for each controlling one or more plug-in loads; motor control units for controlling motor loads, such as ceiling fans or exhaust fans; drive units for controlling motorized window treatments or projection screens; motorized interior or exterior shutters; thermostats for a heating and/or cooling systems; temperature control devices for controlling setpoint temperatures of HVAC systems; air conditioners; compressors; electric baseboard heater controllers; controllable dampers; humidity control units; dehumidifiers; water heaters; pool pumps; televisions; computer monitors; audio systems or amplifiers; generators; electric chargers, such as electric vehicle chargers; an alternative energy controllers; occupancy sensors, vacancy sensors, daylight sensors, temperature sensors, humidity sensors, security sensors, proximity sensors, keypads, battery-powered remote controls, key fobs, cell phones, smart phones, tablets, personal digital assistants, personal computers, timeclocks, audio-visual controls, safety devices, and central control transmitters.

Additionally, the techniques described herein may be implemented as a set of computer-executable instructions stored on a computer-readable medium, such as a random-access or read-only memory for example. Such computer-executable instructions may be executed by a processor or microcontroller, such as a microprocessor, within the dimmer switch 110 or the wireless control device 120, for example.

What is claimed is:

1. A load control system comprising:
   a device configured to communicate on a first wireless communication network via a first wireless communication protocol;
   a plurality of load control devices configured to communicate on the first wireless communication network via the first wireless communication protocol and on a second wireless communication network via a second wireless communication protocol, wherein each load control device of the plurality of load control devices is configured to:
      receive, via the first wireless communication network, a trigger from the device to access a second wireless communication network;
      access the second wireless communication network;
      execute a task on the second wireless communication network; and
      leave the second wireless communication network after completion of the task.

2. The load control system of claim 1, wherein the device from which the trigger is received comprises one of a sensor device, a remote control device, or a wireless control device.

3. The load control system of claim 2, wherein the sensor is an occupancy sensor, and wherein the trigger is received from the occupancy sensor in response to detecting occupancy in an environment.

4. The load control system of claim 2, wherein the trigger is received from the remote control device in response to a button press.

5. The load control system of claim 1, wherein each load control device is configured to use access information pre-configured in memory to access the second wireless communication network.

6. The load control system of claim 1, wherein each load control device is configured to use access information to access the second wireless communication network, and wherein the access information is received by each load control device in the trigger from the device or in a message from another device on the first wireless communication network.

7. The load control system of claim 1, wherein the task to be executed on the second wireless communication network is received by each load control device in the trigger on the first wireless communication network.

8. The load control system of claim 7, wherein the task to be executed is control of an electrical load in response to control instructions sent in the trigger received by each load control device on the first wireless communication network.

9. The load control system of claim 1, wherein each load control device is configured to leave the second wireless communication network in response to a predetermined time or in response to receiving a disconnect signal from another device on the second wireless communication network after completion of the task.

10. The load control system of claim 1, wherein the plurality of load control devices comprise lighting control devices.

11. The load control system of claim 1, wherein each load control device is configured to use the first wireless communication network for transmitting or receiving lower-bandwidth data, and wherein each load control device is configured to use the second wireless communication network for transmitting or receiving higher-bandwidth data.

12. The load control system of claim 11, wherein the higher-bandwidth data comprises configuration data, firmware upgrades, or programming data.

13. The load control system of claim 11, wherein the lower-bandwidth data comprises operational commands for controlling the plurality of load control devices.

14. A method comprising:
   receiving, by each load control device of a plurality of load control devices, a trigger from a device to access a second wireless communication network using a second protocol, wherein the trigger to access the second wireless communication network is received by each load control device via a first protocol on a first wireless communication network;
   accessing, by each load control device, the second wireless communication network; executing a task for each load control device on the second wireless communication network; and
   leaving the second wireless communication network after completion of the task at each load control device.

15. The method of claim 14, wherein the device from which the trigger is received comprises one of a sensor device, a remote control device, or a wireless control device.

16. The method of claim 15, wherein the sensor is an occupancy sensor, and wherein the trigger is received by each load control device from the occupancy sensor in response to detecting occupancy in an environment.

17. The method of claim 15, wherein the trigger is received by each load control device from the remote control device in response to a button press.

18. The method of claim 14, wherein each load control device is configured to use access information preconfigured in memory to access the second wireless communication network.

19. The method of claim 14, wherein each load control device is configured to use access information to access the second wireless communication network, the method further comprising:
 receiving, by each load control device, the access information in the trigger from the device or in a message from another device on the first wireless communication network.

20. The method of claim 14, wherein the task to be executed on the second wireless communication network is received by each load control device in the trigger on the first wireless communication network.

21. The method of claim 20, wherein the task to be executed is control of an electrical load in response to control instructions sent in the trigger received by each load control device on the first wireless communication network.

22. The method of claim 14, wherein each load control device is configured to leave the second wireless communication network in response to a predetermined time or in response to receiving a disconnect signal from another device on the second wireless communication network after completion of the task.

23. The method of claim 14, wherein the plurality of load control devices comprise lighting control devices.

24. The method of claim 14, wherein the first wireless communication network is used by the plurality of load control devices for transmitting or receiving lower-bandwidth data, and wherein the second wireless communication network is used by the plurality of load control devices for transmitting or receiving higher-bandwidth data.

25. The method of claim 24, wherein the higher-bandwidth data comprises configuration data, firmware upgrades, or programming data.

26. The method of claim 24, wherein the lower-bandwidth data comprises operational commands for controlling the plurality of load control devices.

* * * * *